US012347958B2

(12) United States Patent
Ura et al.

(10) Patent No.: US 12,347,958 B2
(45) Date of Patent: Jul. 1, 2025

(54) ELECTRICAL CONNECTOR WITH INNER AND OUT TERMINALS WITH A COMPACT CONFIGURATION AND CONNECTOR SET USING THE SAME

(71) Applicant: IRISO ELECTRONICS CO., LTD., Yokohama (JP)

(72) Inventors: Takahiro Ura, Yokohama (JP); Hiroaki Yukutake, Yokohama (JP); Takayuki Arai, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 260 days.

(21) Appl. No.: 17/886,572

(22) Filed: Aug. 12, 2022

(65) Prior Publication Data

US 2023/0059871 A1 Feb. 23, 2023

(30) Foreign Application Priority Data

Aug. 19, 2021 (JP) ................................. 2021-134362

(51) Int. Cl.
*H01R 13/42* (2006.01)
*H01R 12/72* (2011.01)
(Continued)

(52) U.S. Cl.
CPC ........... *H01R 13/42* (2013.01); *H01R 12/724* (2013.01); *H01R 13/11* (2013.01); *H01R 13/502* (2013.01);
(Continued)

(58) Field of Classification Search
CPC ...... H01R 13/42; H01R 12/724; H01R 13/11; H01R 13/502; H01R 13/639;
(Continued)

(56) References Cited

U.S. PATENT DOCUMENTS 5,932,841 A 8/1999 Matsumoto et al.
6,475,035 B1 * 11/2002 Warislohner ......... H01R 13/642 439/607.17
(Continued)

FOREIGN PATENT DOCUMENTS

JP H08241763 A 9/1996
JP 2017204335 A 11/2017
(Continued)

OTHER PUBLICATIONS

Extended European search report for European patent application No. 22190362.8, dated Jan. 25, 2023, 8 pages.
(Continued)

*Primary Examiner* — Justin M Kratt
(74) *Attorney, Agent, or Firm* — Westman, Champlin & Koehler, P.A.

(57) ABSTRACT

A board connector including an inner terminal including a connection portion for connecting to an inner conductor, an outer terminal, and a terminal unit-side dielectric body. The outer terminal includes a terminal-side covering portion covering the inner terminal in a state in which the connection portion protrudes outward, and a terminal-side extension portion extending from the terminal-side covering portion and extending alongside the connection portion. The terminal unit-side dielectric body is provided between the inner terminal and the outer terminal at an inside of the terminal-side covering portion so as to support the inner terminal.

4 Claims, 23 Drawing Sheets

(51) Int. Cl.

| | |
|---|---|
| ***H01R 13/11*** | (2006.01) |
| ***H01R 13/502*** | (2006.01) |
| ***H01R 13/639*** | (2006.01) |
| ***H01R 13/6589*** | (2011.01) |
| ***H01R 13/659*** | (2011.01) |
| ***H01R 43/16*** | (2006.01) |
| *H01R 12/71* | (2011.01) |
| *H01R 13/10* | (2006.01) |
| *H01R 13/40* | (2006.01) |
| *H01R 13/422* | (2006.01) |
| *H01R 13/424* | (2006.01) |
| *H01R 13/426* | (2006.01) |
| *H01R 13/506* | (2006.01) |
| *H01R 13/514* | (2006.01) |
| *H01R 13/6582* | (2011.01) |
| *H01R 13/6585* | (2011.01) |
| *H01R 13/6586* | (2011.01) |
| *H01R 13/6587* | (2011.01) |
| *H01R 24/50* | (2011.01) |

(52) U.S. Cl.

CPC ....... *H01R 13/639* (2013.01); *H01R 13/6589* (2013.01); *H01R 13/659* (2013.01); *H01R 43/16* (2013.01); *H01R 12/71* (2013.01); *H01R 12/712* (2013.01); *H01R 12/716* (2013.01); *H01R 13/10* (2013.01); *H01R 13/40* (2013.01); *H01R 13/422* (2013.01); *H01R 13/424* (2013.01); *H01R 13/426* (2013.01); *H01R 13/506* (2013.01); *H01R 13/514* (2013.01); *H01R 13/6582* (2013.01); *H01R 13/6585* (2013.01); *H01R 13/6586* (2013.01); *H01R 13/6587* (2013.01); *H01R 24/50* (2013.01)

(58) Field of Classification Search

CPC .. H01R 13/6589; H01R 13/659; H01R 43/16; H01R 12/71; H01R 12/712; H01R 12/716; H01R 13/10; H01R 13/40; H01R 13/422; H01R 13/424; H01R 13/426; H01R 13/506; H01R 13/514; H01R 13/6582; H01R 13/6585; H01R 13/6586; H01R 13/6587; H01R 24/50

See application file for complete search history.

(56) References Cited

U.S. PATENT DOCUMENTS

| | | | | |
|---|---|---|---|---|
| 10,515,745 | B2 | 12/2019 | Nakamura | |
| 10,790,617 | B2 * | 9/2020 | Takahashi | .......... H01R 13/6581 |
| 2018/0158576 | A1 | 6/2018 | Nakamura | |
| 2021/0203108 | A1 | 7/2021 | Liu et al. | |
| 2022/0224041 | A1 | 7/2022 | Karita | |

FOREIGN PATENT DOCUMENTS

| | | | |
|---|---|---|---|
| JP | 2018092844 | A | 6/2018 |
| JP | 2019114457 | A | 7/2019 |
| JP | 2020198162 | A | 12/2020 |

OTHER PUBLICATIONS

Copy of and translation of Japanese Patent Application No. 2021-134362, dated Mar. 12, 2025, 8 pages.

* cited by examiner

ELECTRICAL CONNECTOR WITH INNER AND OUT TERMINALS WITH A COMPACT CONFIGURATION AND CONNECTOR SET USING THE SAME

CROSS-REFERENCE TO RELATED APPLICATION

This application claims priority to Japanese Patent Application No. 2021-134362, filed on Aug. 19, 2021, the disclosure of which is incorporated herein by reference in its entirety.

BACKGROUND

Technical Field

The present disclosure relates to a connector and a connector set.

Related Art

Japanese Patent Application Laid-Open (JP-A) No. 2018-92844 discloses a jack connector and a plug connector for connecting to the jack connector. The jack connector includes a jack-side central contact disposed at a central portion of the jack connector, a jack-side outer contact having a tube shape covering the jack-side central contact, and a jack-side insulation base provided between the jack-side central contact and the jack-side outer contact. The plug connector includes a plug-side central contact disposed as a central portion of the plug connector, a cylindrical portion having a tube shape covering the plug-side central contact, and a plug-side insulation base provided between the plug-side central contact and the cylindrical portion. Connecting the jack connector to the plug connector results in the jack-side central contact and the plug-side central contact being connected together, and the jack-side outer contact and the cylindrical portion being connected together.

However, the jack connector and the plug connector described in JP-A No. 2018-92844 are configured to be connected together in a state in which the jack-side outer contact and the cylindrical portion both overlap with each other in the radial direction. There is accordingly room for improvement from the viewpoint of achieving a more compact configuration of the connection section between the jack connector and the plug connector in the radial direction (connection axis intersection direction).

SUMMARY

In consideration of the above circumstances, an object of the present disclosure is to obtain a connector and a connector set enabling a more compact configuration to be achieved in a connection axis intersection direction.

A connector of a first aspect is a connector including: an inner terminal including a connection portion that is connected to an inner conductor; and an outer terminal including: a terminal-side covering portion covering the inner terminal in a state in which the connection portion protrudes outward, and a terminal-side extension portion extending from the terminal-side covering portion so as to extend alongside the connection portion; and a terminal-side dielectric body provided between the inner terminal and the outer terminal at an inside of the terminal-side covering portion, so as to support the inner terminal.

The connector of the first aspect includes the inner terminal, the outer terminal, and the terminal-side dielectric body. The outer terminal includes the terminal-side covering portion covering the inner terminal in the state in which the connection portion of the inner terminal protrudes outward, and the terminal-side extension portion that extends from the terminal-side covering portion so as to extend alongside the connection portion. The configuration of this connector enables the connection section between the inner conductor and the connection portion of the inner terminal to be covered by part of a counterparty connector for connecting to this connector and by the terminal-side extension portion. In this configuration there is no need to arrange the outer terminal and part of the counterparty connector so as to overlap with each other in a direction intersecting with a connection direction between the inner conductor and the connection portion of the inner terminal (the connection axis intersection direction) due to the connection section between the inner conductor and the connection portion of the inner terminal being covered. This thereby enables a more compact configuration of the connector to be achieved in the connection axis intersection direction.

A connector of a second aspect is the connector of the first aspect wherein the outer terminal includes a first terminal forming sheet formed from a metal sheet and a second terminal forming sheet formed from a metal sheet, and the terminal-side covering portion is formed by the first terminal forming sheet and the second terminal forming sheet.

In the connector of the second aspect the outside terminal configured including the terminal-side covering portion can be formed cheaply by the first terminal forming sheet and the second terminal forming sheet.

A connector of a third aspect is the connector of the second aspect comprising a plurality of inner terminals, wherein: the outer terminal includes a single first terminal forming sheet and a plurality of second terminal forming sheets, and a plurality of terminal-side covering portions are each formed between the single first terminal forming sheet and the plurality of second terminal forming sheets so as to respectively cover the plurality of inner terminals.

In the connector of the third aspect the plural terminal-side covering portions can be formed along the single first terminal forming sheet.

A connector of a fourth aspect is the connector of the second aspect or the third aspect wherein: the first terminal forming sheet includes a first main sheet portion, and the second terminal forming sheet includes a second main sheet portion not touching the first main sheet portion, the first terminal forming sheet includes a first side sheet portion extending from the first main sheet portion toward the second main sheet portion, and the second terminal forming sheet includes a second side sheet portion extending from the second main sheet portion toward the first main sheet portion, and the terminal-side covering portion is formed from the first main sheet portion, the second main sheet portion, and at least one of the first side sheet portion or the second side sheet portion.

In the connector of the fourth aspect the terminal-side covering portion is formed from the first main sheet portion, the second main sheet portion, and at least one out of the first side sheet portion or the second side sheet portion. This configuration enables a terminal-side covering portion to be formed easily so as to correspond, for example, to an inner terminal having a bent or curved shape.

A connector of a fifth aspect is a connector including: an inner conductor that connects to an inner terminal; an outer conductor including a conductor-side covering portion covering the inner conductor and formed with a cutout portion at an outer peripheral portion on a side to which the inner terminal connects; and a conductor-side dielectric body provided between the inner conductor and the outer conductor and at an inside of the conductor-side covering portion, supporting the inner conductor, and having an outer peripheral portion exposed at the cutout portion.

The connector of the fifth aspect includes the inner conductor, the outer conductor, and the conductor-side dielectric body. The outer conductor includes the conductor-side covering portion covering the inner conductor and formed with the cutout portion at an outer peripheral portion on the side to which the inner terminal connects. The outer peripheral portion of the conductor-side dielectric body is exposed at the cutout portion. This configuration of connector enables part of the counterparty connector for connection to this connector to be disposed along the cutout portion. This thereby enables the connection section between the inner conductor and the inner terminal to be covered by the part of the counterparty connector and the outer conductor. In this configuration there is no need to arrange the outer conductor and part of the counterparty connector so as to overlap with each other in a direction intersecting with the connection direction between the inner conductor and the inner terminal (the connection axis intersection direction) due to the connection section between the inner conductor and the inner terminal being covered. This enables a more compact configuration of the connector to be achieved in the connection axis intersection direction.

A connector set of a sixth aspect includes: a first connector that is the connector of any one of the first aspect to the fourth aspect; and a second connector that is the connector of fifth aspect; wherein: the connection portion of the inner terminal is connected to the inner conductor in a state in which the first connector has been connected to the second connector, and the outer terminal is connected to the outer conductor in a state in which the terminal-side extension portion has been disposed so as to close off the cutout portion, and a connection section between the connection portion of the inner terminal and the inner conductor is covered by the outer conductor and the terminal-side extension portion.

In the connector set of the sixth aspect the connection portion of the inner terminal is connected to the inner conductor in a state in which the first connector has been connected to the second connector, and the outer terminal is connected to the outer conductor in a state in which the terminal-side extension portion has been disposed so as to close off the cutout portion. The connection section between the connection portion of the inner terminal and the inner conductor is also covered by the outer conductor and the terminal-side extension portion. In this configuration there is no need to arrange the outer conductor and the outer terminal so as to overlap with each other in the direction intersecting with the connection direction between the inner conductor and the inner terminal (the connection axis intersection direction) due to the connection section between the connection portion of the inner conductor and the inner terminal being covered. This thereby enables a more compact configuration of the connector set to be achieved in the connection axis intersection direction.

The connector set of a seventh aspect is the connector set of the sixth aspect wherein: the terminal-side extension portion includes a base plate disposed along a section of the conductor-side dielectric body exposed at the cutout portion, and a contact portion disposed along an edge of the cutout portion, and the contact portion contacts the edge of the cutout portion in a state biased toward the edge of the cutout portion.

In the connector set of the seventh aspect, the section of the conductor-side dielectric body exposed at the cutout portion can be covered by the base plate of the terminal-side extension portion. Moreover, the contact portion of the terminal-side extension portion contacts the edge of the cutout portion in a state biased toward the edge of the cutout portion, enabling a stable conducting state to be secured between the outer terminal and the outer conductor.

The connector and connector set according to the present disclosure exhibit the excellent advantageous effect of enabling a more compact configuration to be achieved in the connection axis intersection direction.

BRIEF DESCRIPTION OF THE DRAWINGS

Exemplary embodiments of the present disclosure will be described in detail based on the following figures, wherein.

DETAILED DESCRIPTION

A connector set 10 according to an exemplary embodiment of the present disclosure will now be described, with reference to FIG. 1 to FIG. 23.

Figure 1:
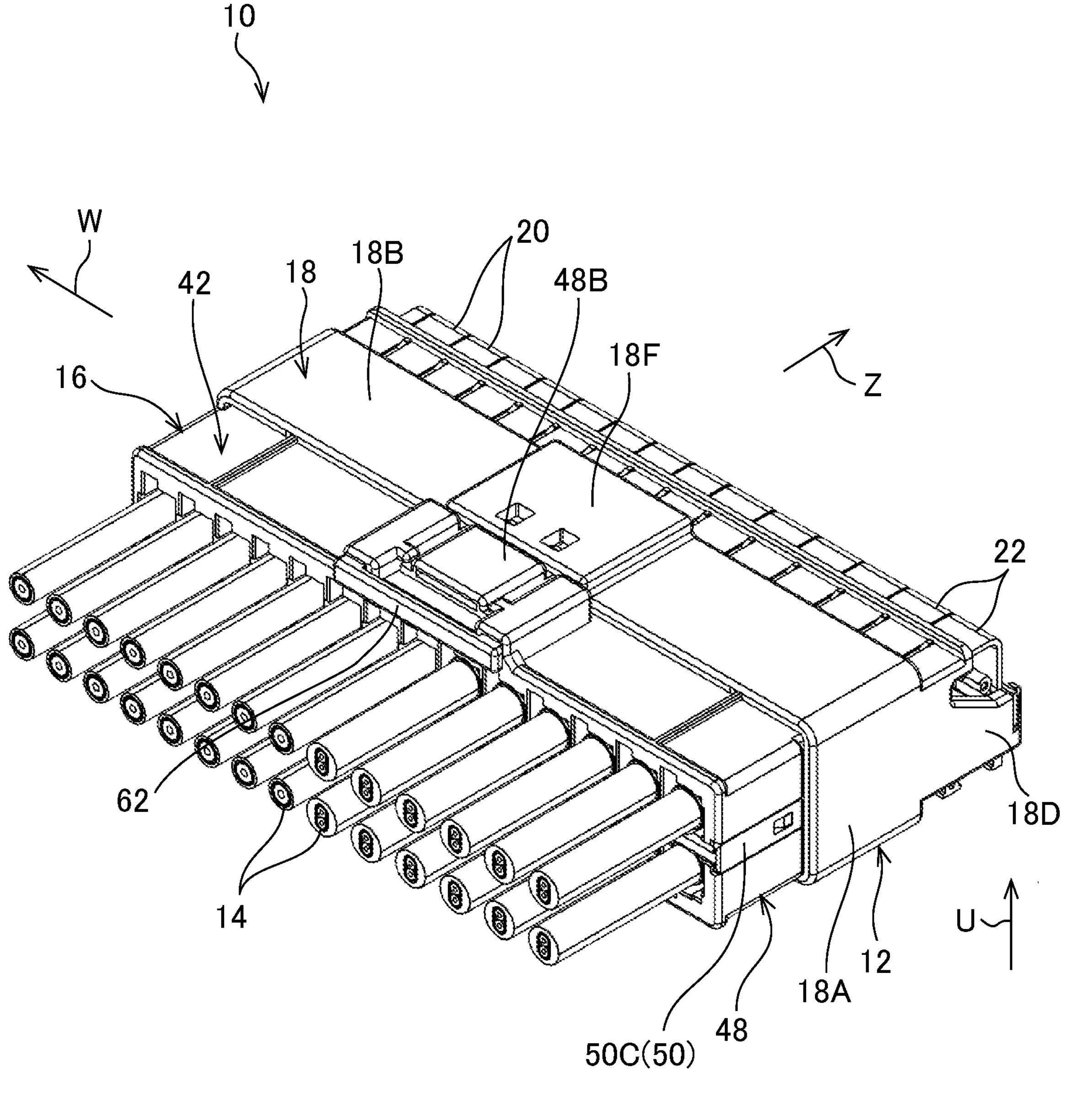
FIG. 1 is a perspective view illustrating a connector set.

As illustrated in FIG. 1, the connector set 10 is configured including a board connector 12 serving as a connector for fixing to a non-illustrated circuit board and as a first connector, and a wiring connector 16 serving as a connector for fixing to ends of wires 14 and as a second connector. Note that a direction to connect the board connector 12 and the wiring connector 16 together is called a connection axis direction. A direction that is orthogonal to the connection axis direction and is a direction along which plural terminal units 20, 22, described later, are placed in a row is called a width direction. Furthermore, a direction orthogonal to both the connection axis direction and the width direction is called an up-down direction. Arrow Z indicates a connection axis direction one side, arrow W indicates a width direction one side, and arrow U indicates an upper side in the up-down direction.

Board Connector 12 Configuration

Figure 2:
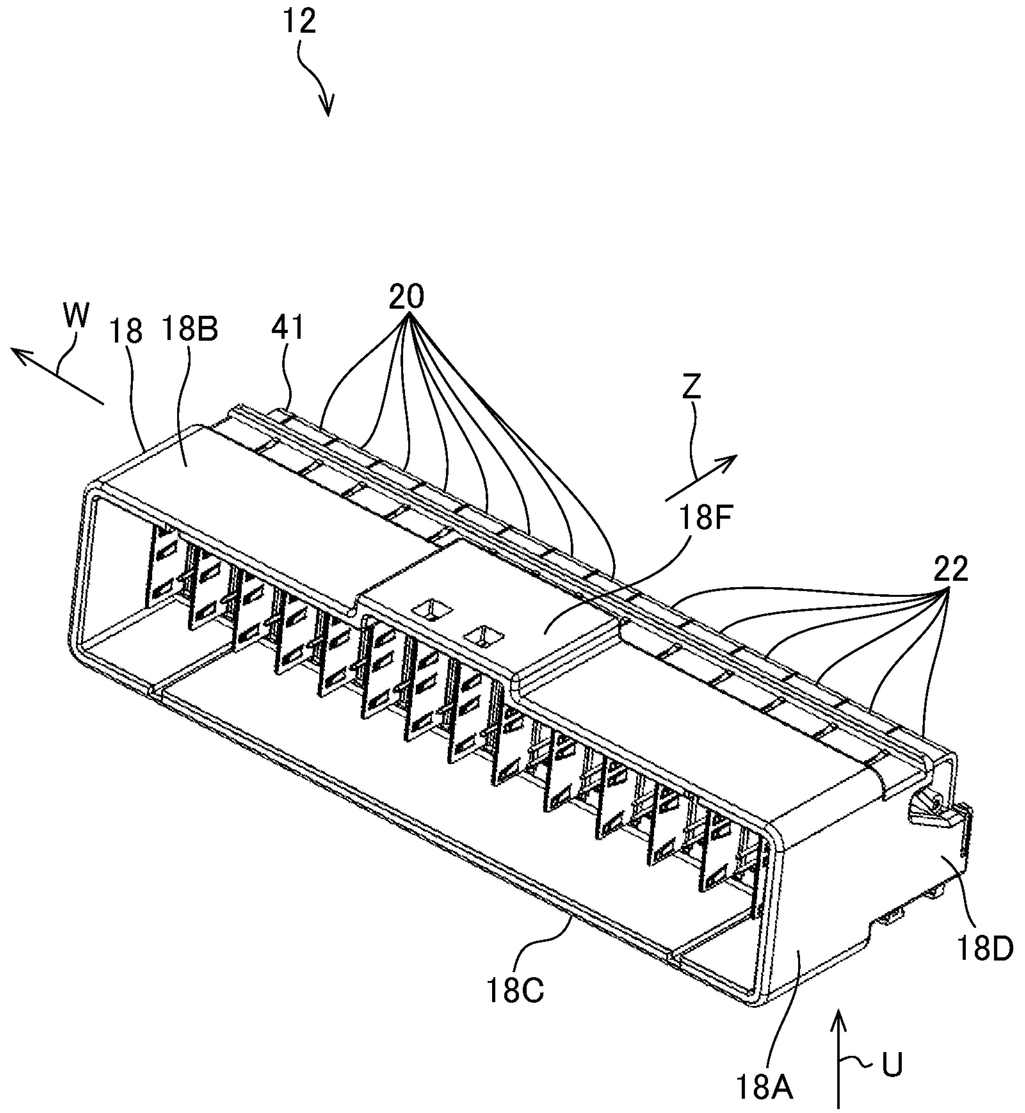
FIG. 2 is a perspective view illustrating a board connector.
Figure 3:
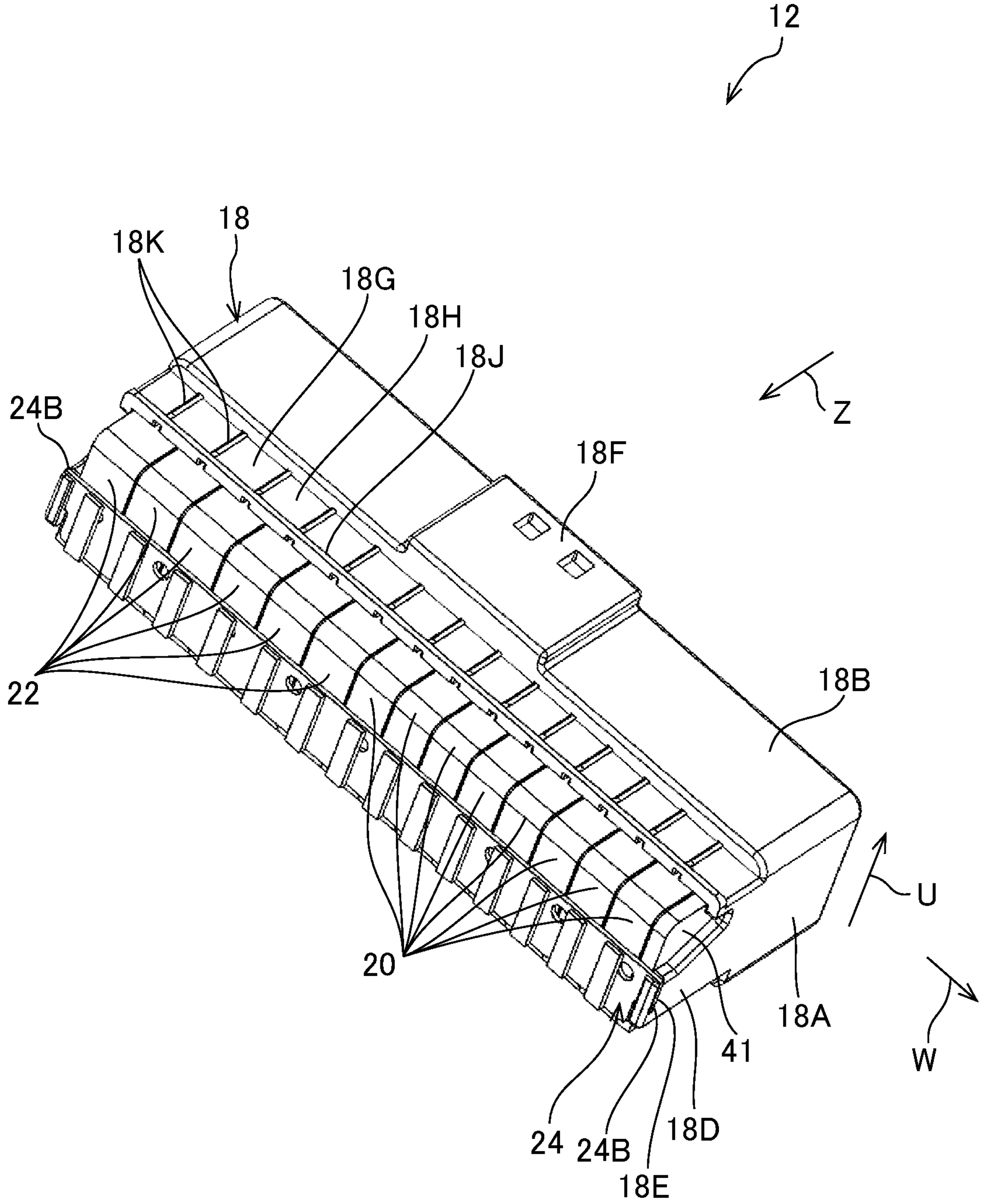
FIG. 3 is a perspective view looking at the board connector from the opposite side to in FIG. 2.

As illustrated in FIG. 2 and FIG. 3, the board connector 12 is configured including a terminal unit housing 18, the plural terminal units 20, 22 housed in the terminal unit housing 18, and a coupling member 24 anchored to the terminal unit housing 18.

Figure 4:
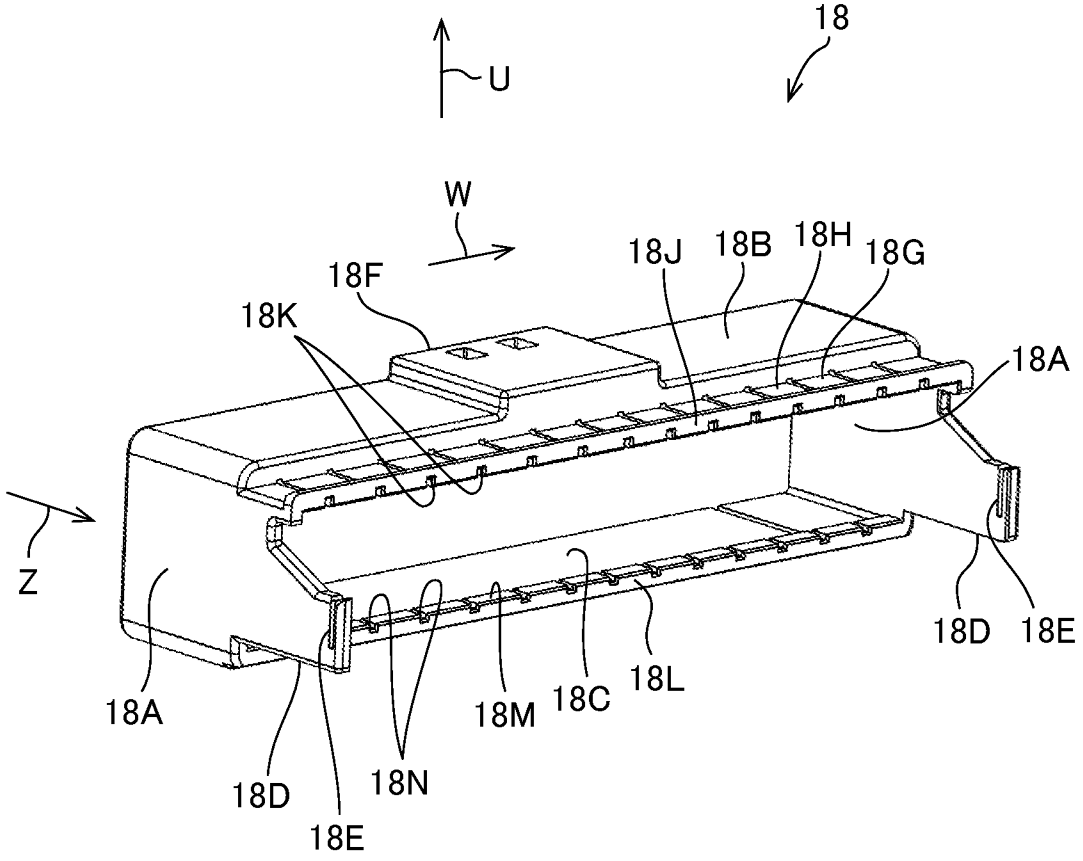
FIG. 4 is a perspective view illustrating a terminal unit housing.
Figure 5:
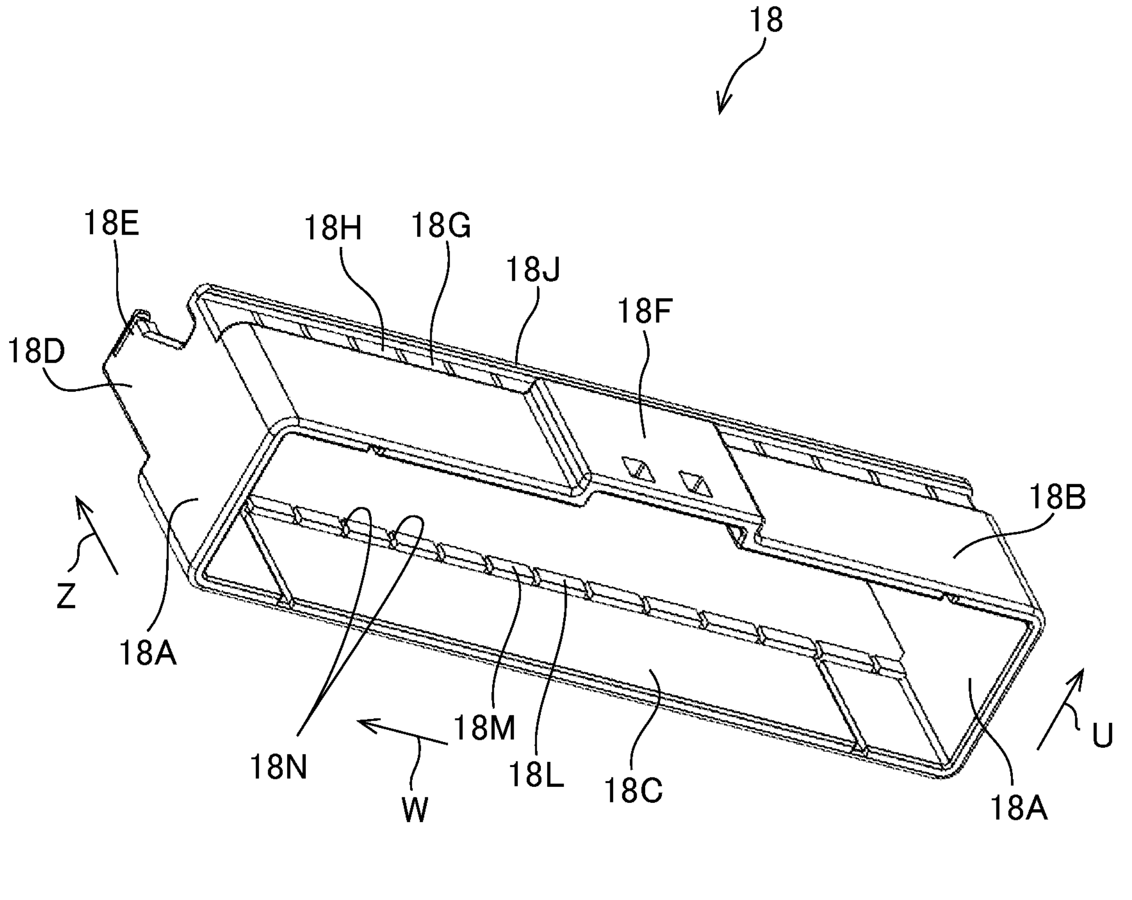
FIG. 5 is a perspective view looking at the terminal unit housing from the opposite side to in FIG. 4.

As illustrated in FIG. 4 and FIG. 5, the terminal unit housing 18 is formed in a rectangular frame shape. The terminal unit housing 18 includes a pair of side walls 18A disposed so as to be separated from each other in the width direction, an upper wall 18B connecting upper ends of the pair of side walls 18A together along the width direction, and a lower wall 18C connecting lower ends of the pair of side walls 18A together along the width direction.

Portions on the connection axis direction one side of the pair of side walls 18A are configured as separation restricting portions 18D and extend with respect to the upper wall 18B and the lower wall 18C toward the connection axis direction one side. An anchor groove 18E opening upward is formed in each of the separation restricting portions 18D of the pair of side walls 18A.

A first retainer portion 18F is formed as a connection retainer portion at a width direction central portion in the upper wall 18B. An end portion on the connection axis direction one side of the upper wall 18B is configured as an upper anchor section 18G for anchoring upper side portions of the plural terminal units 20, 22, described later. The upper anchor section 18G is configured including an upper base plate 18H extending in the width direction and having a thickness direction along the up-down direction, and an upper flange 18J bending around from the connection axis direction one side end of the upper base plate 18H and extending upward. Plural upper anchor grooves 18K are formed along the connection axis direction in the upper anchor section 18G and are disposed at intervals along the width direction. The number of the upper anchor grooves 18K matches the number of the terminal units 20, 22, described later. Namely, in the present exemplary embodiment there are fourteen of the upper anchor grooves 18K formed in the upper anchor section 18G. Moreover, the upper anchor grooves 18K are formed so as to penetrate through the upper base plate 18H and are also formed so as to be open downward at respective portions on the lower side of the upper flange 18J.

An end portion at the connection axis direction one side of the lower wall 18C is configured as a lower anchor portion 18L for anchoring portions at a lower side of the plural terminal units 20, 22, described later. The lower anchor portion 18L includes a lower flange portion 18M bending around from the connection axis direction one side end of the lower wall 18C and extending upward. Moreover, plural lower anchor grooves 18N are formed along the connection axis direction in the lower flange portion 18M and are disposed at intervals along the width direction. The number of the lower anchor grooves 18N matches the number of the terminal units 20, 22, described later. Namely, in the present exemplary embodiment there are fourteen of the lower anchor grooves 18N formed in the lower flange portion 18M. The lower anchor grooves 18N are also formed so as to be open upward at respective portions on the upper side of the lower flange portion 18M.

Figure 6:
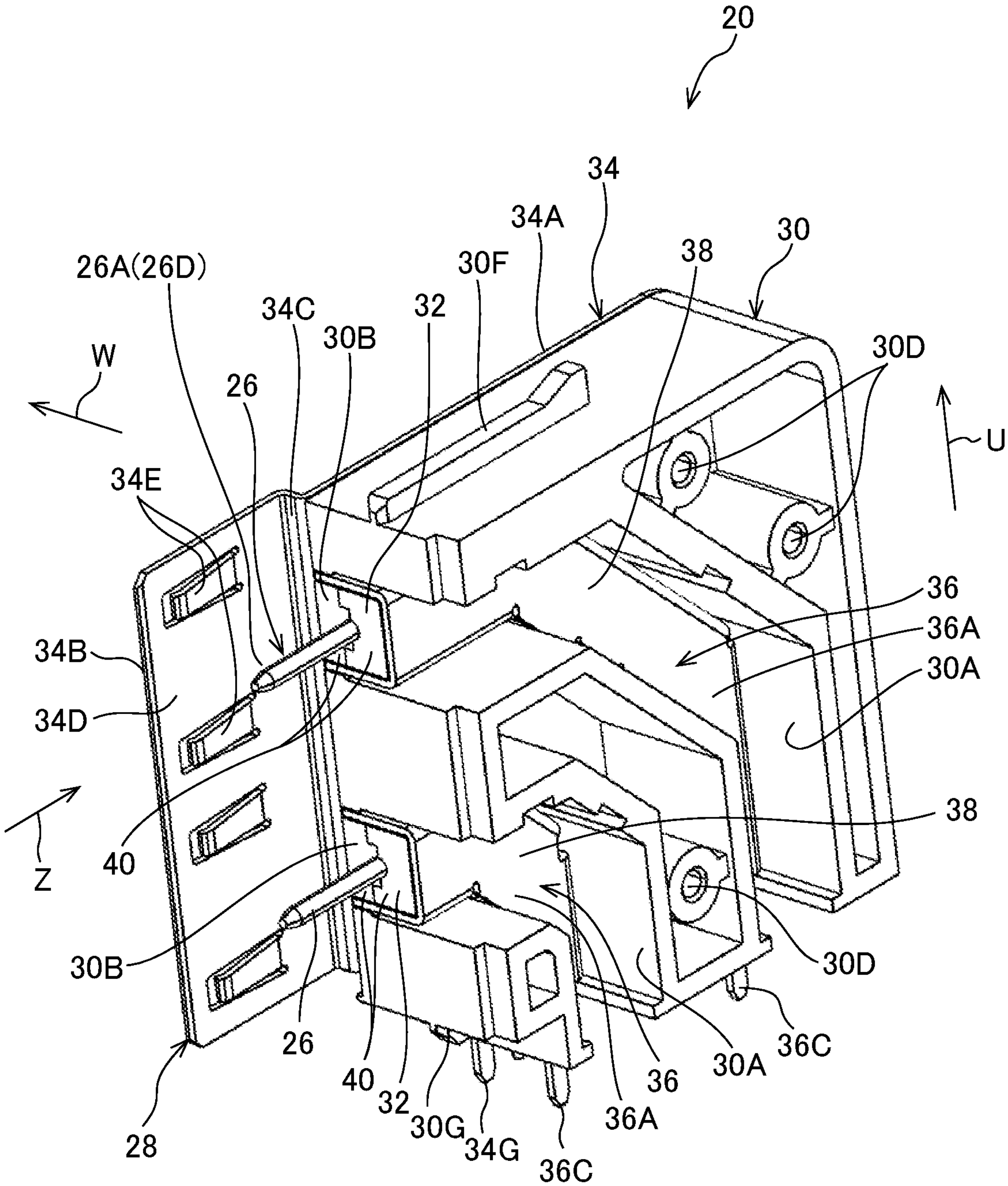
FIG. 6 is a perspective view illustrating a terminal unit.
Figure 7:
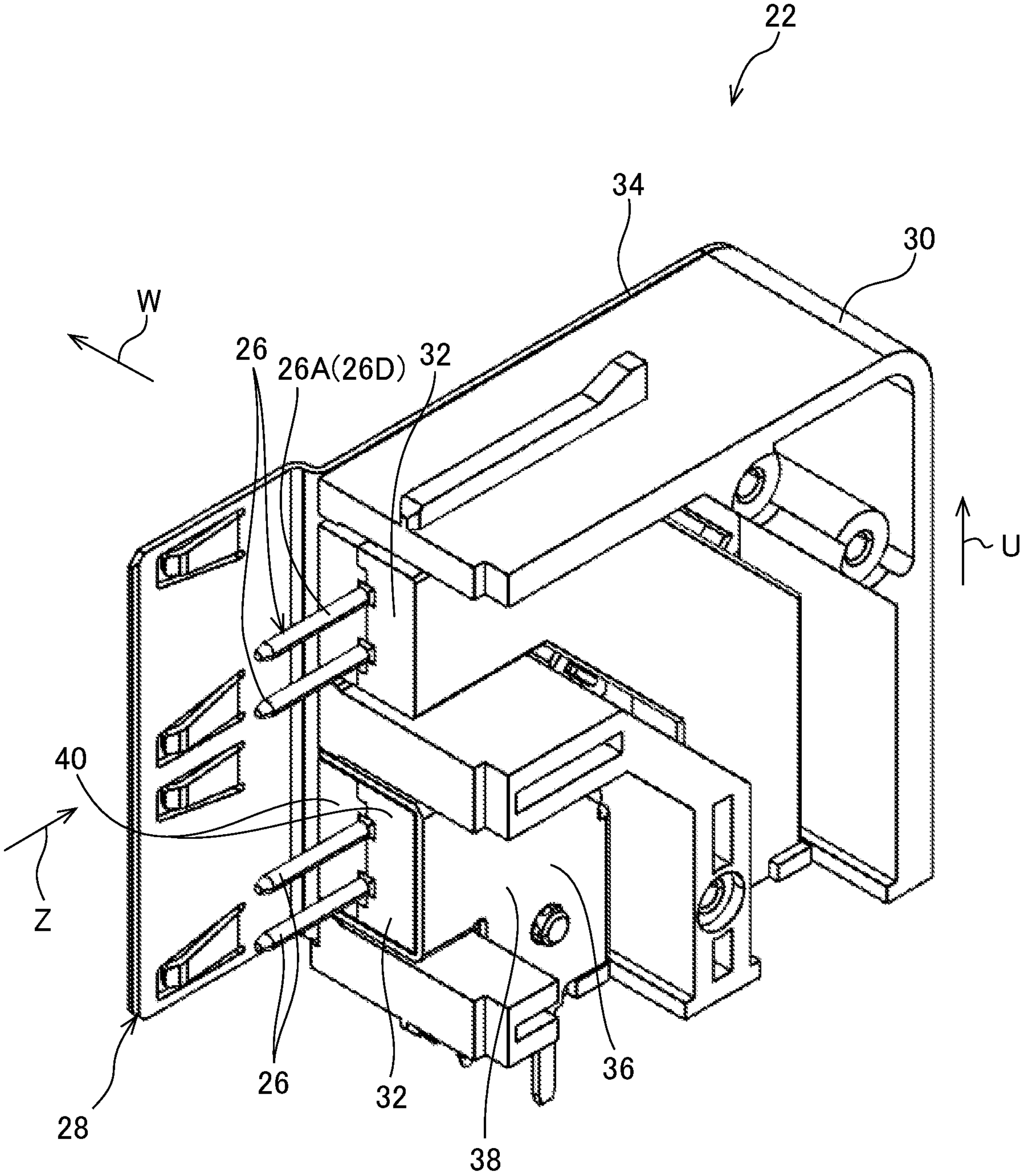
FIG. 7 is a perspective view illustrating a terminal unit.

As illustrated in FIG. 3, FIG. 6 and FIG. 7, the board connector 12 of the present exemplary embodiment is configured including eight of the terminal units 20 and six of the terminal units 22. As illustrated in FIG. 6 and FIG. 7, the configurations of the terminal units 20 and the terminal units 22 are similar configurations except in that there are a different number of inner terminals 26. Thus a description follows of a configuration of the terminal units 20, and description of the configuration of the terminal units 22 will be omitted. Note that in the terminal units 22 the same reference numerals are appended to the members and portions that correspond to the terminal units 20 as are appended to the corresponding members and portions in the terminal units 20 themselves.

Figure 8:
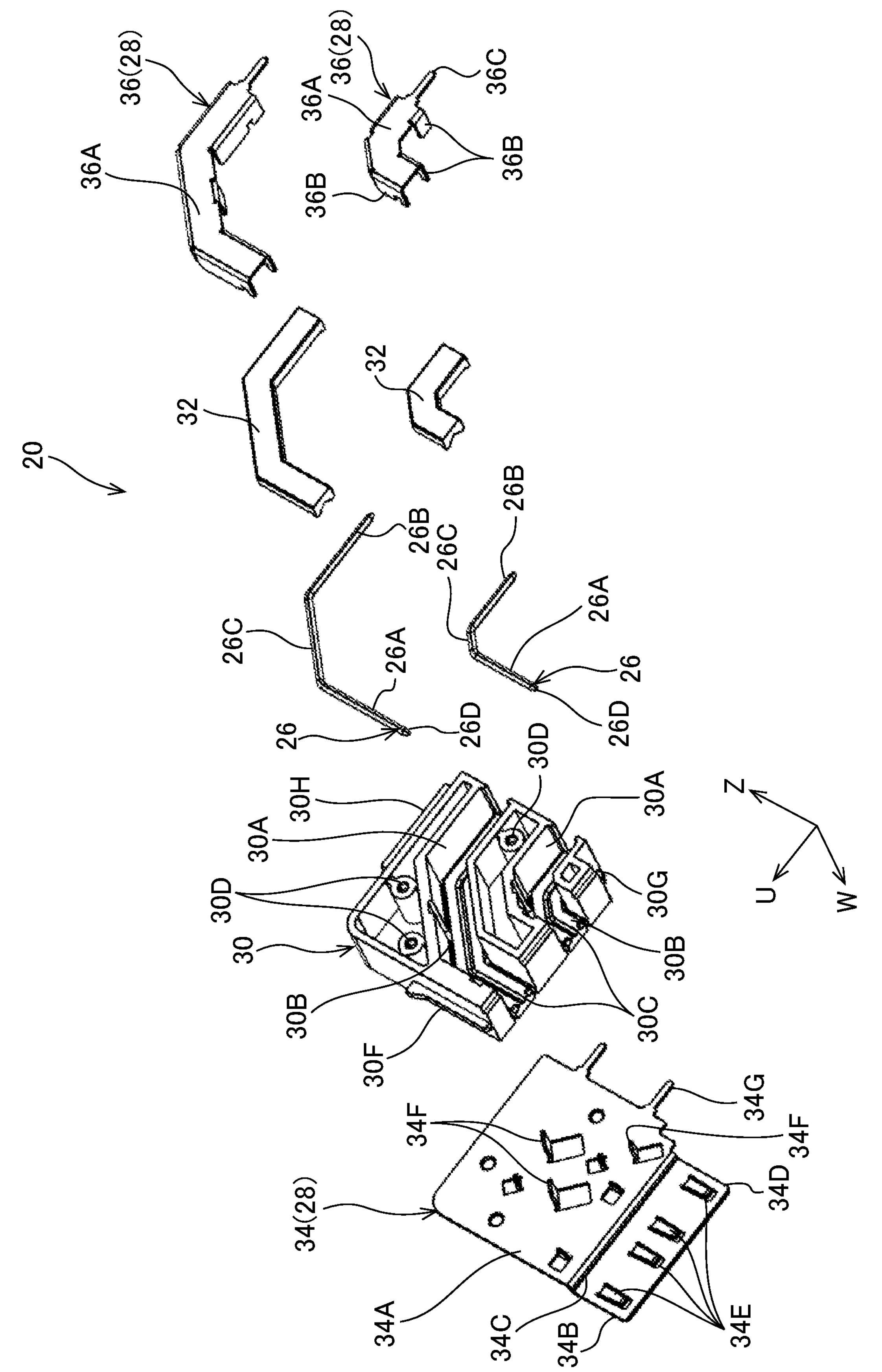
FIG. 8 is an exploded perspective view illustrating an exploded terminal unit.
Figure 9:
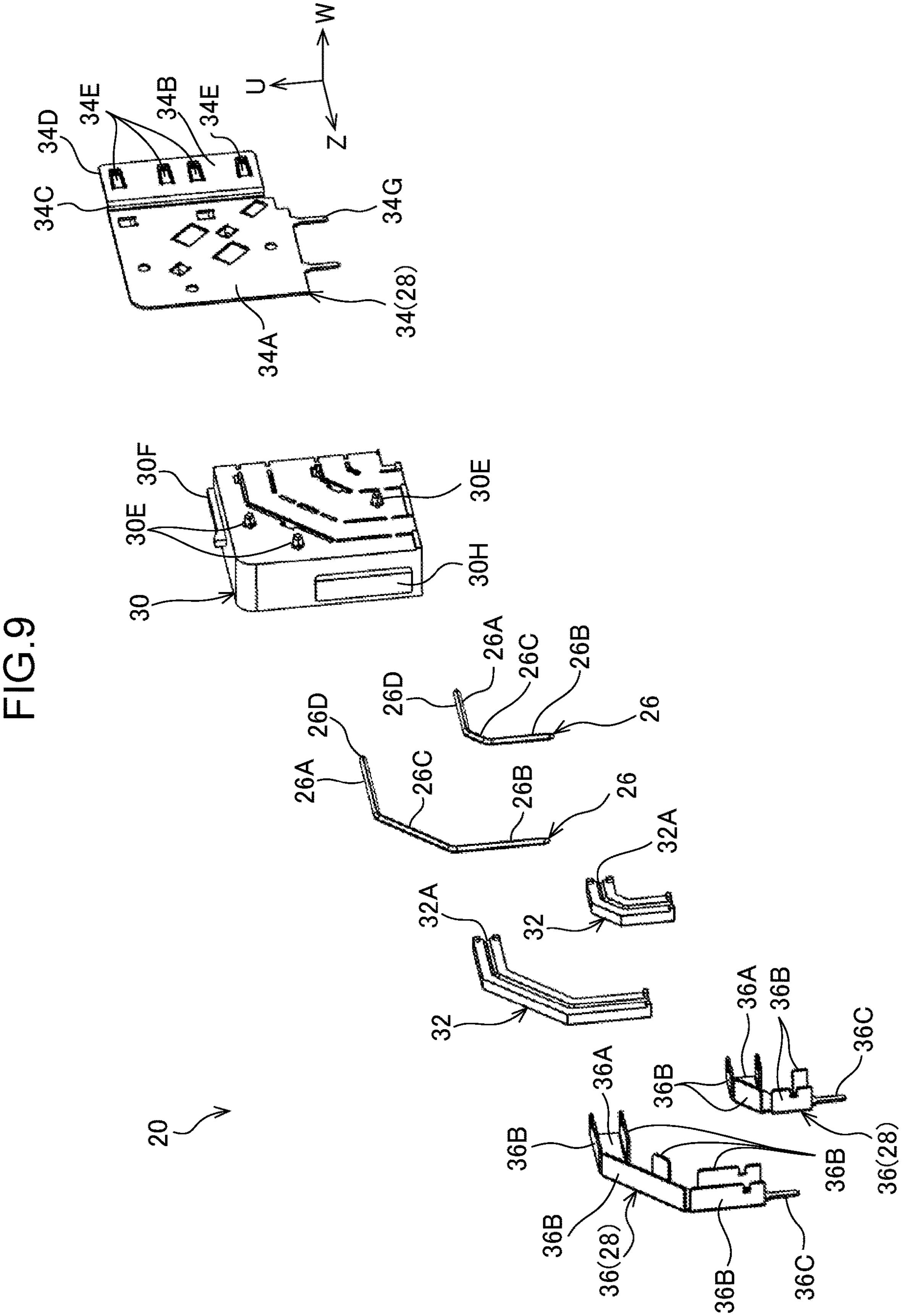
FIG. 9 is an exploded perspective view looking at the terminal unit from the opposite side to in FIG. 8.

As illustrated in FIG. 6, FIG. 8, and FIG. 9, each terminal unit 20 includes two of the inner terminals 26 and an outer terminal 28 covering the two inner terminals 26. Each terminal unit 20 includes a terminal body 30 and two support members 32.

One of the inner terminals 26 is formed by, for example, taking a rod shaped member made from a conductive metal material and fold-bending it into a specific shape. This inner terminal 26 includes a fitting-side extension portion 26A configuring an end portion on one side of the inner terminal 26, a board-side extension portion 26B configuring an end portion on the other side of the inner terminal 26, and an intermediate extension portion 26C connecting the fitting-side extension portion 26A and the board-side extension portion 26B together. The fitting-side extension portion 26A extends along the connection axis direction, with one end side thereof configuring a connection portion 26D for connection to an inner conductor 52 of a conductor unit 44, described later. The board-side extension portion 26B extends along the up-down direction, with one end side thereof configuring a portion for connection to a non-illustrated circuit board. The intermediate extension portion 26C extends diagonally so as to slope downwards on progression toward the connection axis direction one side.

The other of the inner terminals 26 is formed similarly to the one inner terminal 26 by, for example, fold-bending a shorter rod shaped member than the one inner terminal 26 into a specific shape. Note that the same reference numerals to those of the corresponding portions of the one inner terminal 26 are appended to the portions of the other inner terminal 26 corresponding to these portions of the one inner terminal 26. The fitting-side extension portion 26A of the other inner terminal 26 is below the fitting-side extension portion 26A of the one inner terminal 26 and extends parallel to the fitting-side extension portion 26A of the one inner terminal 26. Moreover, the board-side extension portion 26B of the other inner terminal 26 is at the connection axis direction other side with respect to the board-side extension portion 26B of the one inner terminal 26 and extends parallel to the board-side extension portion 26B of the one inner terminal 26. The intermediate extension portion 26C of the other inner terminal 26 is below and to the connection axis direction other side with respect to the intermediate extension portion 26C of the one inner terminal 26 and extends parallel to the intermediate extension portion 26C of the one inner terminal 26.

As illustrated in FIG. 8 and FIG. 9, the outer terminal 28 is configured including a single first terminal forming sheet 34 formed from a metal sheet, and two second terminal forming sheets 36 formed from metal sheets and disposed at the width direction other side with respect to the first terminal forming sheet 34.

The first terminal forming sheet 34 is formed by, for example, fold-bending a metal sheet cut out in a specific shape. The first terminal forming sheet 34 includes a rectangular shaped first main sheet portion 34A having a thickness direction in the width direction and extending in the up-down direction and the connection axis direction, and a rectangular shaped terminal-side extension portion 34B extending toward the connection axis direction other side from the connection axis direction other side end of the first main sheet portion 34A. A step portion 34C where there is a height difference in the width direction is formed at the boundary between the first main sheet portion 34A and the terminal-side extension portion 34B. The terminal-side extension portion 34B is accordingly offset to the width direction one side with respect to the first main sheet portion 34A. The terminal-side extension portion 34B is configured including a base plate 34D formed in a flat plate shape, and plural contact portions 34E cut and raised toward the width direction other side with respect to the base plate 34D. In the present exemplary embodiment there are four of the contact portions 34E arranged at intervals along the up-down direction. As illustrated in FIG. 8, the first terminal forming sheet 34 includes three first side sheet portions 34F each formed by cutting and raising one portion thereof. These three first side sheet portions 34F are each formed in the shape of a tongue extending from the first main sheet portion 34A toward a respective second main sheet portion 36A of the second terminal forming sheets 36, described later. The first terminal forming sheet 34 includes connection tabs 34G protruding from the first main sheet portion 34A for connecting to the non-illustrated circuit board.

As illustrated in FIG. 8 and FIG. 9, one of the second terminal forming sheets 36 is formed by, for example, fold-bending a metal sheet cutout in a specific shape. Each second terminal forming sheet 36 includes the second main sheet portion 36A having a thickness direction in the width direction and extending in the up-down direction and the connection axis direction. The shape of the second main sheet portion 36A is a shape corresponding to the one inner terminal 26 as viewed along the width direction. Each second terminal forming sheet 36 includes plural second side sheet portions 36B that extend from edges of the second main sheet portion 36A toward the first main sheet portion 34A side of the first terminal forming sheet 34. Furthermore, each second terminal forming sheet 36 includes also include a connection tab portion 36C protruding from the second main sheet portion 36A for connecting to the non-illustrated circuit board.

The other second terminal forming sheet 36 is formed by, for example, fold-bending a metal sheet cutout into a smaller specific shape than the one second terminal forming sheet 36. This second terminal forming sheet 36 includes a second main sheet portion 36A and plural second side sheet portions 36B respectively corresponding to the second main sheet portion 36A and the plural second side sheet portions 36B of the one second terminal forming sheet 36. The shape of the second main sheet portion 36A of the other second terminal forming sheet 36 is a shape corresponding to the other inner terminal 26 when viewed along the width direction.

Figure 10:
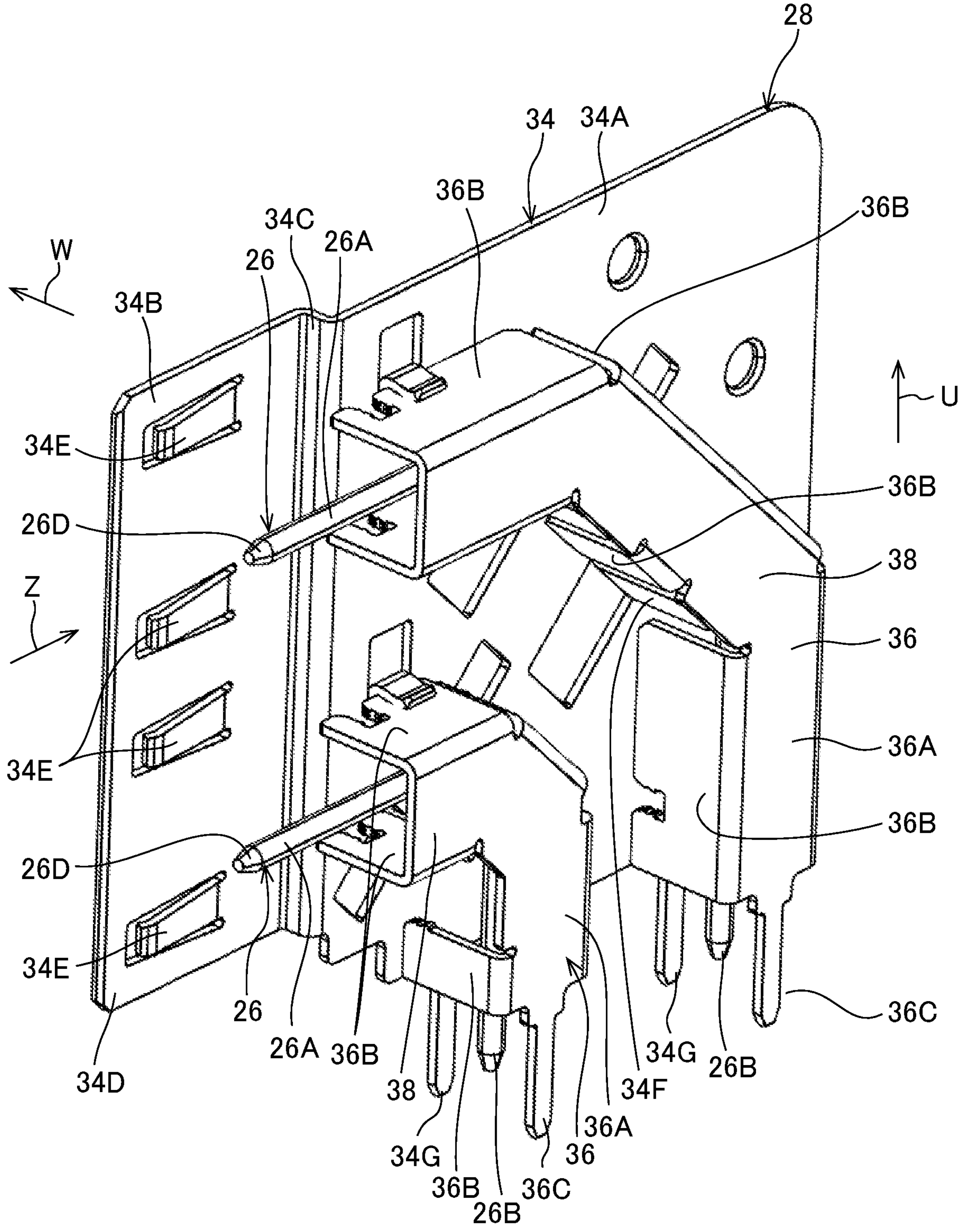
FIG. 10 is a perspective view illustrating a terminal unit in which a terminal body and support members have been omitted from illustration.
Figure 11:
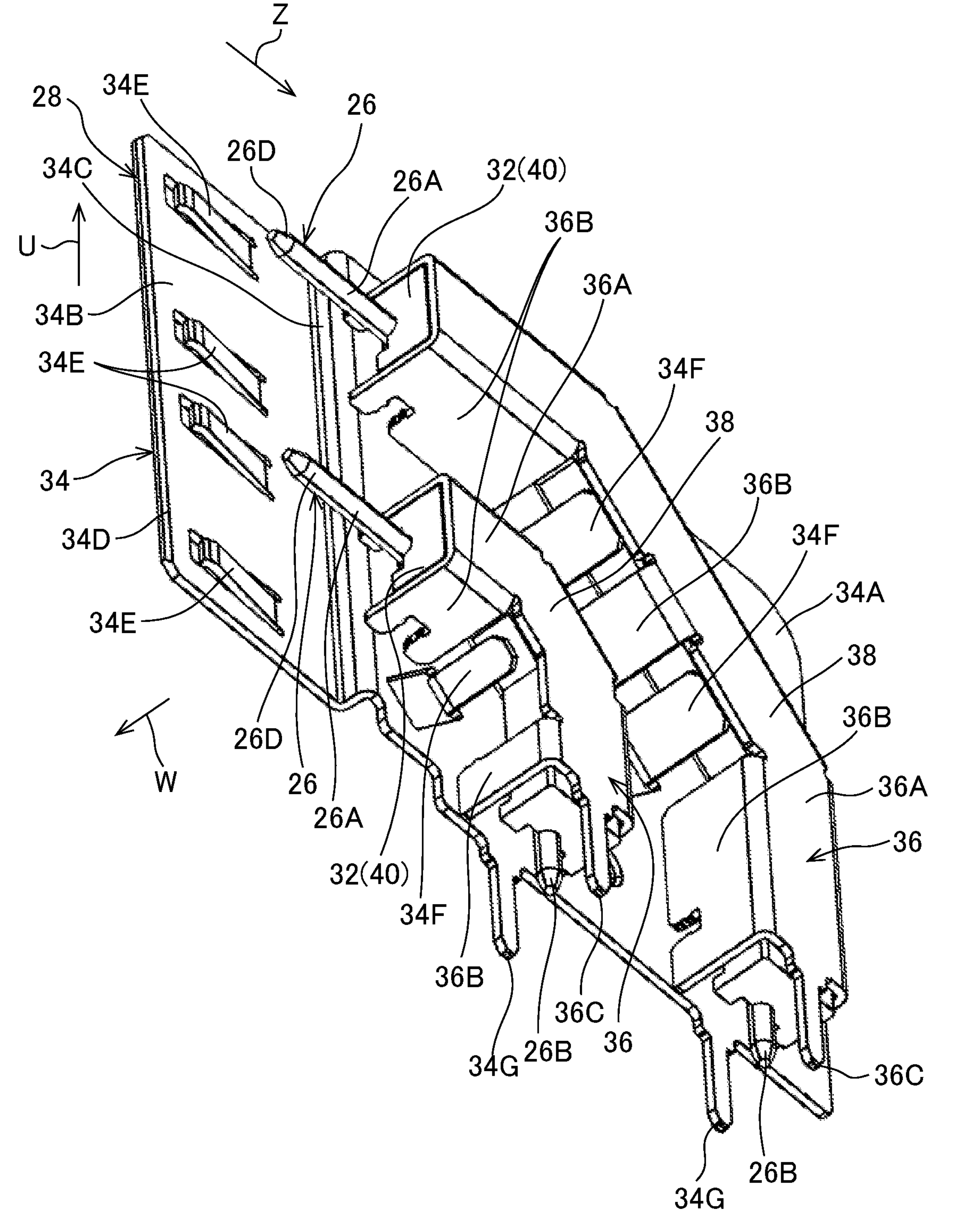
FIG. 11 is a perspective view illustrating a terminal unit in which a terminal body has been omitted from illustration.

As illustrated in FIG. 6, FIG. 10, and FIG. 11, one terminal-side covering portion 38 is formed so as to cover most of the one inner terminal 26 using the first terminal forming sheet 34 and the one second terminal forming sheet 36. Another terminal-side covering portion 38 is formed so as to cover most of the other inner terminal 26 using the first terminal forming sheet 34 and the other second terminal forming sheet 36. The one terminal-side covering portion 38 and the other terminal-side covering portion 38 are formed by the first main sheet portion 34A, the second main sheet portion 36A, and at least one out of the first side sheet portions 34F or the second side sheet portions 36B.

More specifically, portions of the one terminal-side covering portion 38 covering the fitting-side extension portion 26A and the board-side extension portion 26B of the one inner terminal 26 are formed by the first main sheet portion 34A, the second main sheet portion 36A, and the second side sheet portions 36B. Moreover, a central portion of a portion of the one terminal-side covering portion 38 covering the intermediate extension portion 26C of the one inner terminal 26 is formed by the first main sheet portion 34A, the second main sheet portion 36A, and the second side sheet portions 36B. Furthermore, both side portions of a portion of the one terminal-side covering portion 38 covering the intermediate extension portion 26C of the one inner terminal 26 are formed by the first main sheet portion 34A, the second main sheet portion 36A, the first side sheet portions 34F, and the second side sheet portions 36B.

Portions of the other terminal-side covering portion 38 covering the fitting-side extension portion 26A and the board-side extension portion 26B of the one inner terminal 26 are formed by the first main sheet portion 34A, the second main sheet portion 36A, and the second side sheet portions 36B. Moreover, a portion of the other terminal-side covering portion 38 covering the intermediate extension portion 26C of the other inner terminal 26 is formed by the first main sheet portion 34A, the second main sheet portion 36A, the first side sheet portions 34F, and the second side sheet portions 36B.

The connection portion 26D of the one inner terminal 26 protrudes from the one terminal-side covering portion 38 toward the connection direction other side, and an end portion of the board-side extension portion 26B of the one inner terminal 26 protrudes downward from the one terminal-side covering portion 38. The connection portion 26D of the other inner terminal 26 protrudes from the other terminal-side covering portion 38 toward the connection direction other side, and an end portion of the board-side extension portion 26B of the other inner terminal 26 protrudes downward from the other terminal-side covering portion 38. Furthermore, the connection portion 26D of the one inner terminal 26 and the connection portion 26D of the other inner terminal 26 extend parallel to the base plate 34D and alongside the base plate 34D of the terminal-side extension portion 34B of the first terminal forming sheet 34. In other words, the base plate 34D of the terminal-side extension portion 34B of the first terminal forming sheet 34 extends alongside the connection portion 26D of the one inner terminal 26 and the connection portion 26D of the other inner terminal 26.

As illustrated in FIG. 8 and FIG. 9, the terminal body 30 is formed from a resin material in a rectangular box shape. Inner terminal placement recesses 30A are formed in the terminal body 30 so as to be open to the width direction other side for the two inner terminals 26 and the two support members 32 to be arranged in. A bottom portion of each of the inner terminal placement recesses 30A is configured by a support wall 30B for supporting the inner terminal 26. A support groove 30C for fitting the inner terminal 26 into is formed in the support wall 30B. Note there are openings formed in the support wall 30B of the terminal body 30 through which to insert the first side sheet portions 34F of the first terminal forming sheet 34 and the second side sheet portions 36B of the second terminal forming sheets 36. The first side sheet portions 34F of the first terminal forming sheet 34 and the second main sheet portion 36A and the second side sheet portions 36B of the second terminal forming sheets 36 are configured so as to be disposed inner the inner terminal placement recesses 30A.

As illustrated in FIG. 8, the terminal body 30 includes three fitted-to portions 30D that are boss portions formed with a hole open on the width direction other side. As illustrated in FIG. 9, the terminal body 30 also includes three fitting portions 30E that are projecting portions protruding toward the width direction one side. By fitting the fitting portions 30E of the terminal body 30 of the one width direction adjacent terminal unit 20 together with the fitted-to portions 30D of the terminal body 30 of the other width direction adjacent terminal unit 20, relative displacement of the one terminal unit 20 with respect to the other terminal unit 20 is limited in the connection axis direction and in the up-down direction. Note that openings are formed in the first main sheet portion 34A of the first terminal forming sheet 34 for inserting the three fitting portions 30E through.

As illustrated in FIG. 6 and FIG. 8, an upper anchor projection 30F is formed along the connection axis direction at a width direction central portion of an upper portion of the terminal body 30 so as to protrude upward. A lower anchor projection 30G is formed along the connection axis direction at a width direction central portion of a lower portion of the terminal body 30 so as to protrude downward. Furthermore, as illustrated in FIG. 9, a coupling member anchor portion 30H is formed along the up-down direction at a width direction central portion of a connection axis direction side end portion of the terminal body 30 for anchoring a coupling member 24, described later.

As illustrated in FIG. 8 and FIG. 9, the two support members 32 are each formed from a resin material in a block shape. The two support members 32 are configured so as to each be arranged inner a space surrounded by the second main sheet portion 36A and the second side sheet portions 36B of the two second terminal forming sheets 36. A support groove 32A is formed at the width direction one side of the two support members 32 for fitting the inner terminal 26 into.

As illustrated in FIG. 6, in an assembled state of the terminal unit 20, most of each of the inner terminals 26 is supported by the support wall 30B and the support member 32 of the terminal body 30 in a state disposed inner the terminal-side covering portion 38 of the outer terminal 28. The support wall 30B of the terminal body 30 and the support member 32 configure a terminal unit-side dielectric body 40 serving as a terminal-side dielectric body arranged between the inner terminal 26 and the outer terminal 28.

Figure 12:
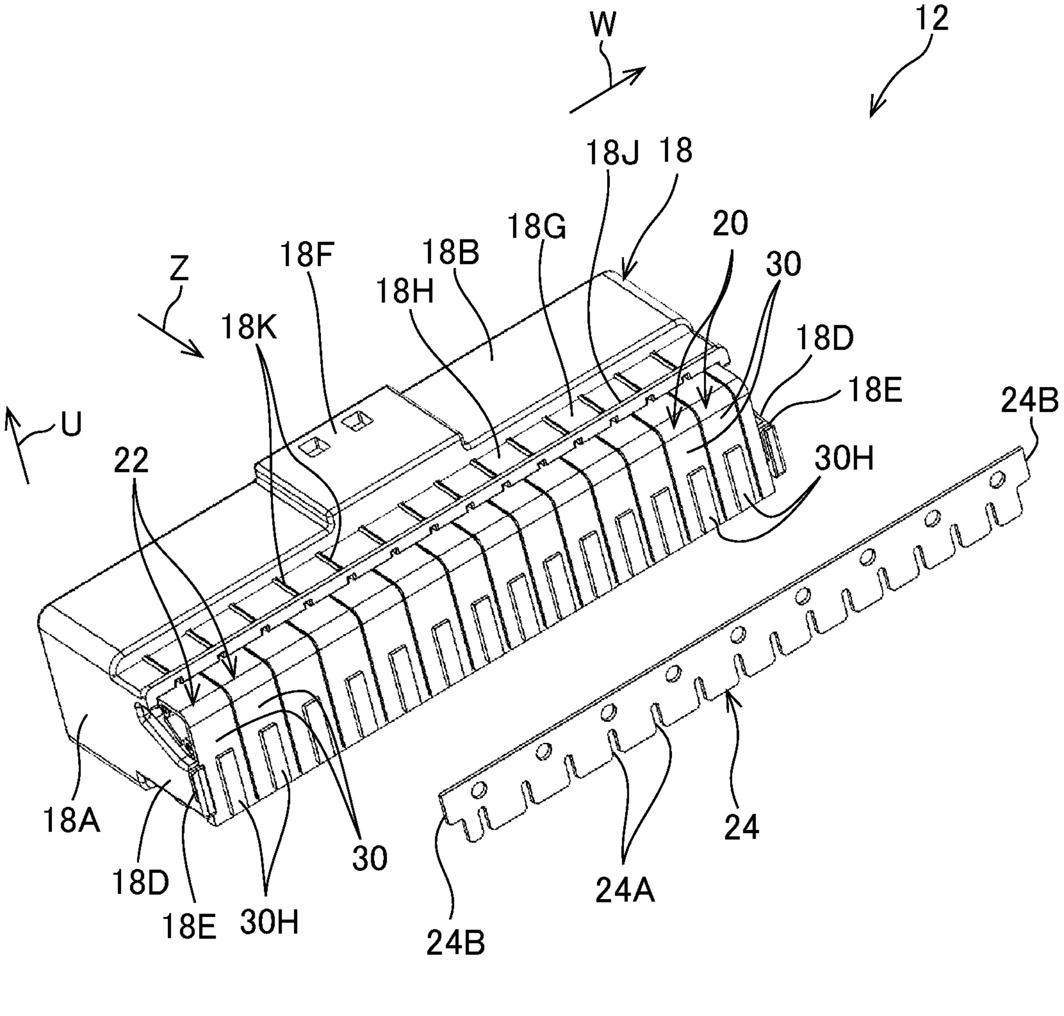
FIG. 12 is a perspective view illustrating plural terminal units arrayed in a terminal unit housing and a coupling member.

As illustrated in FIG. 12, the coupling member 24 is formed from a metal sheet. The coupling member 24 is formed in a rectangular shape having a thickness direction along the connection axis direction and extending in the width direction and the up-down direction. Plural anchor grooves 24A are formed in a lower portion of the coupling member 24 for fitting the coupling member anchor portion 30H of the terminal body 30 into. The plural anchor grooves 24A are arranged at intervals in the width direction. The number of the anchor grooves 24A matches the number of the terminal units 20, 22. Namely, in the present exemplary embodiment there are fourteen of the anchor grooves 24A formed in the coupling member 24. Housing anchor portions 24B are configured at both width direction ends of the coupling member 24 for anchoring in the anchor grooves 18E formed to the separation restricting portions 18D of the terminal unit housing 18.

As illustrated in FIG. 2, FIG. 3, FIG. 4, FIG. 5, FIG. 6, FIG. 7, FIG. 8, FIG. 9, and FIG. 12, the board connector 12 of the present exemplary embodiment is assembled in the following sequence.

First the plural terminal units 20, 22 are arranged in a row along the width direction in a state in which adjacent of the terminal units 20, 22 contact each other. In this state the fitting portions 30E of the terminal body 30 of one of the terminal units 20, 22 are fitted into the fitted-to portions 30D of the terminal body 30 of an adjacent other terminal unit 20, 22. Note that in the present exemplary embodiment there is a spacer 41 provided at the width direction one side. The fitting portions 30E of the terminal body 30 of the terminal unit 20 arranged at the width direction one side end are fitted into the spacer 41.

Next, the plural terminal units 20, 22 arranged in a row along the width direction are assembled to the terminal unit housing 18. Namely, the plural terminal units 20, 22 arranged in a row along the width direction are inserted into the terminal unit housing 18 by moving the plural terminal units 20, 22 arranged in a row along the width direction toward the connection direction other side. When this is performed, the upper anchor projection 30F of the terminal body 30 of each of the terminal units 20, 22 is arranged inner the respective upper anchor groove 18K formed in the terminal unit housing 18, and the lower anchor projection 30G of the terminal body 30 of each of the terminal units 20, 22 is arranged inner the respective lower anchor groove 18N formed to the terminal unit housing 18. The upper anchor projection 30F of the terminal body 30 of each of the terminal units 20, 22 passes the upper anchor section 18G of the terminal unit housing 18 and is anchored to the upper anchor section 18G. Moreover, the lower anchor projection 30G of the terminal body 30 of each of the terminal units 20, 22 passes the lower anchor portion 18L of the terminal unit housing 18 and is anchored to the lower anchor portion 18L. A state is thereby achieved in which the terminal units 20, 22 are assembled to the terminal unit housing 18.

Next, the housing anchor portions 24B of the coupling member 24 are anchored to the anchor grooves 18E formed to the separation restricting portions 18D of the terminal unit housing 18, and the coupling member anchor portion 30H of the terminal body 30 of each of the terminal units 20, 22 is anchored in the respective anchor groove 24A of the coupling member 24.

The board connector 12 is assembled by the steps described above.

Wiring Connector 16 Configuration

Figure 13:
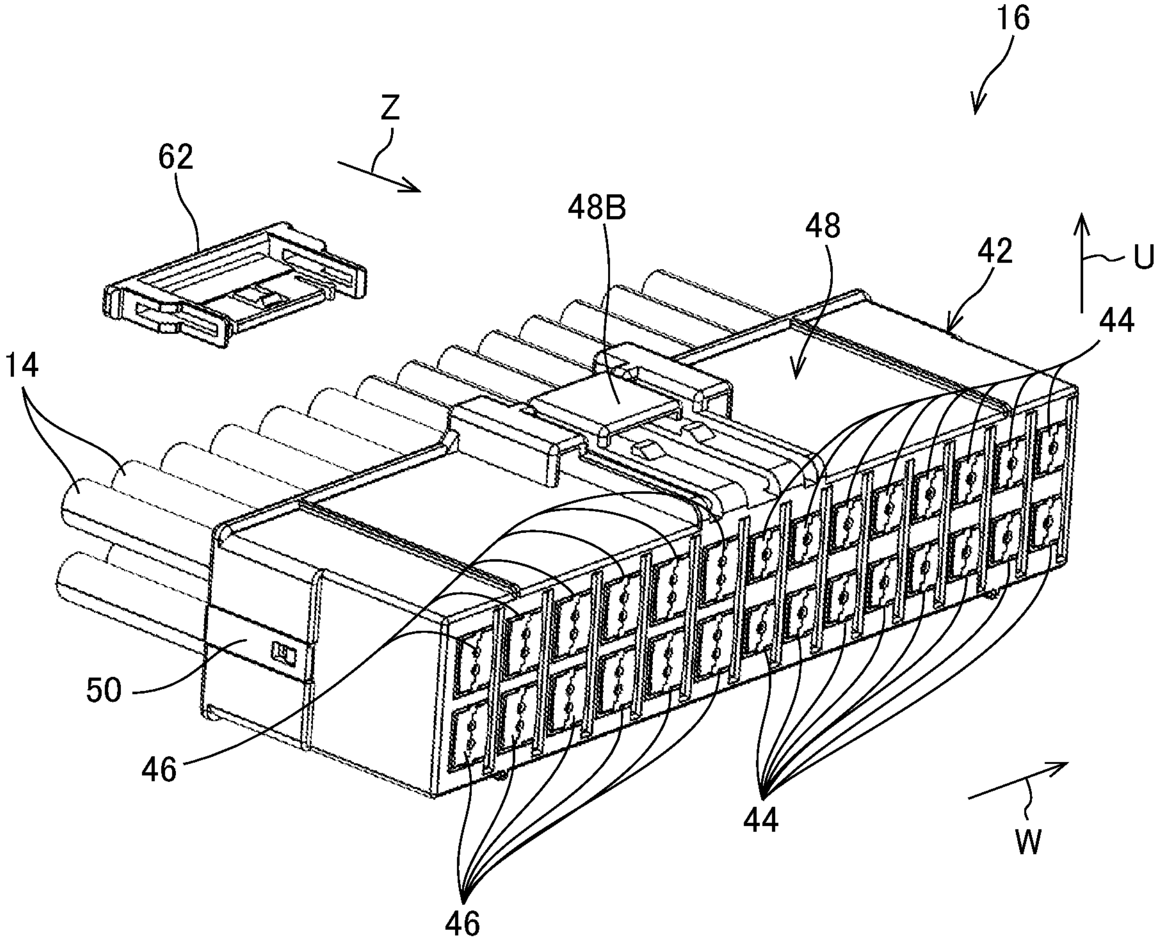
FIG. 13 is a perspective view illustrating a wiring connector and a connection retainer member.

As illustrated in FIG. 13, the wiring connector 16 is configured including a conductor unit housing 42 and two types of conductor unit 44, 46 supported by the conductor unit housing 42.

Figure 14:
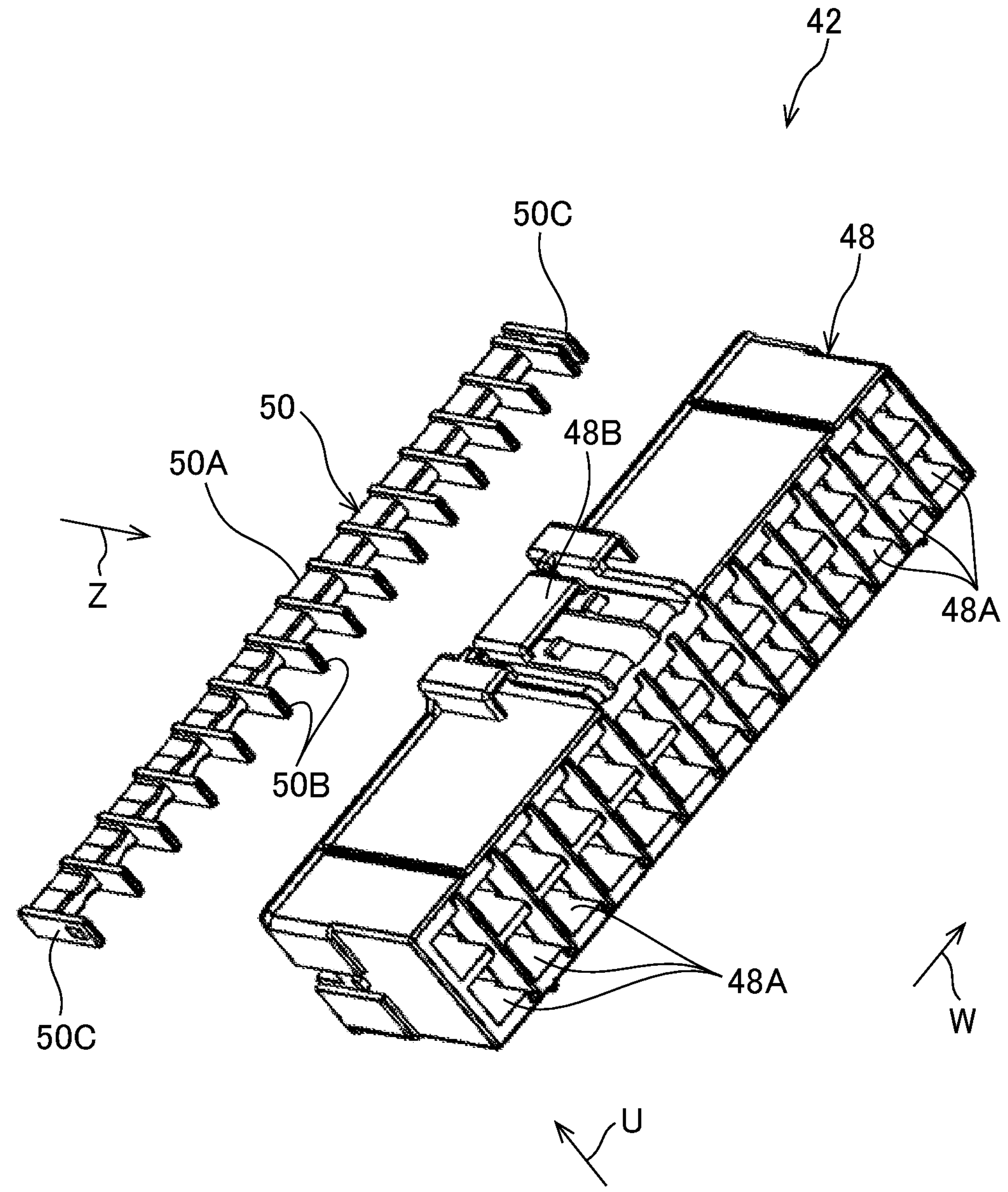
FIG. 14 is an exploded perspective view illustrating an exploded conductor unit housing.
Figure 15:
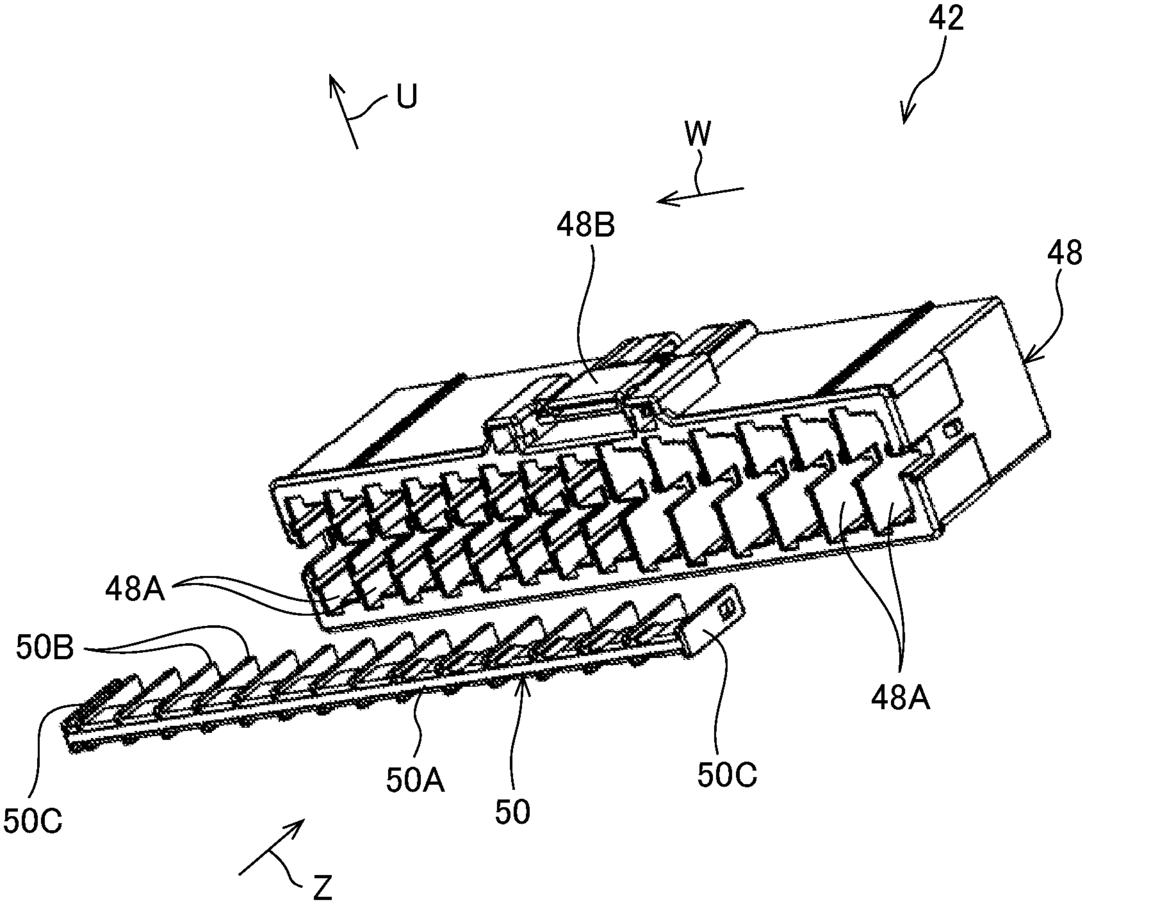
FIG. 15 is an exploded perspective view looking at the conductor unit housing from the opposite side to in FIG. 14.

As illustrated in FIG. 14 and FIG. 15, the conductor unit housing 42 is configured including a conductor unit housing body 48 formed in a rectangular block shape and a pull-out preventer member 50 for anchoring to the conductor unit housing body 48.

Plural conductor unit housing portions 48A are formed to the conductor unit housing body 48 to respectively house each of the plural conductor units 44, 46, described later. The plural conductor unit housing portions 48A are formed so as to pierce through the conductor unit housing body 48 in the connection axis direction. Note that in the present exemplary embodiment the number of the plural conductor unit housing portions 48A matches the number of the plural conductor units 44, 46, described later. Namely, there are twenty-eight of the conductor unit housing portions 48A formed to the conductor unit housing body 48. More specifically, there are fourteen of the conductor unit housing portions 48A formed to an upper portion of the conductor unit housing body 48, and there are fourteen of the conductor unit housing portions 48A formed to a lower portion of the conductor unit housing body 48.

The shapes and dimensions of the inner of each of the conductor unit housing portions 48A are shapes and dimensions that enable the insertion of the conductor units 44, 46, described later, from the connection axis direction other side. The shapes and dimensions of the inner of each of the conductor unit housing portions 48A are set to shapes and dimensions that do not let the conductor units 44, 46 that have been inserted into the conductor unit housing portions 48A be pulled out from the connection axis direction one side.

A second retainer portion 48B is formed as a connection retainer portion to a width direction central portion of an upper portion of the conductor unit housing body 48.

The pull-out preventer member 50 is configured including a main plate 50A having a length direction along the width direction, plural partition plates 50B protruding from the main plate 50A toward the connection axis direction one side and arranged at intervals in the width direction, and a pair of anchor plates 50C respectively protruding from the two width direction ends of the main plate 50A toward the connection axis direction one side. Then, as illustrated in FIG. 13, the pair of anchor plates 50C of the pull-out preventer member 50 are anchored to the two width direction ends of the conductor unit housing body 48 such that the pull-out preventer member 50 is attached to the conductor unit housing body 48. Moreover, in a state in which the pull-out preventer member 50 is attached to the conductor unit housing body 48, each of the conductor units 44, 46 housed in the respective conductor unit housing portion 48A is not able to be pulled out from inner the conductor unit housing portions 48A toward the connection axis direction other side.

As illustrated in FIG. 6, FIG. 7, and FIG. 13, there are sixteen of the conductor units 44 connected to the eight terminal units 20 mentioned above. There are twelve of the conductor units 46 connected to the six terminal units 22 mentioned above. The configurations of the conductor unit 44 and the conductor units 46 are similar configurations except in that the number of the inner conductors 52 differ therebetween. Therefore the configuration of the conductor units 44 will be described below and description of the configuration of the conductor units 46 will be omitted. The same reference numerals to those of corresponding members and portions of the conductor units 44 are appended to the members and portions of the conductor units 46 that correspond to the conductor units 44.

Figure 16:
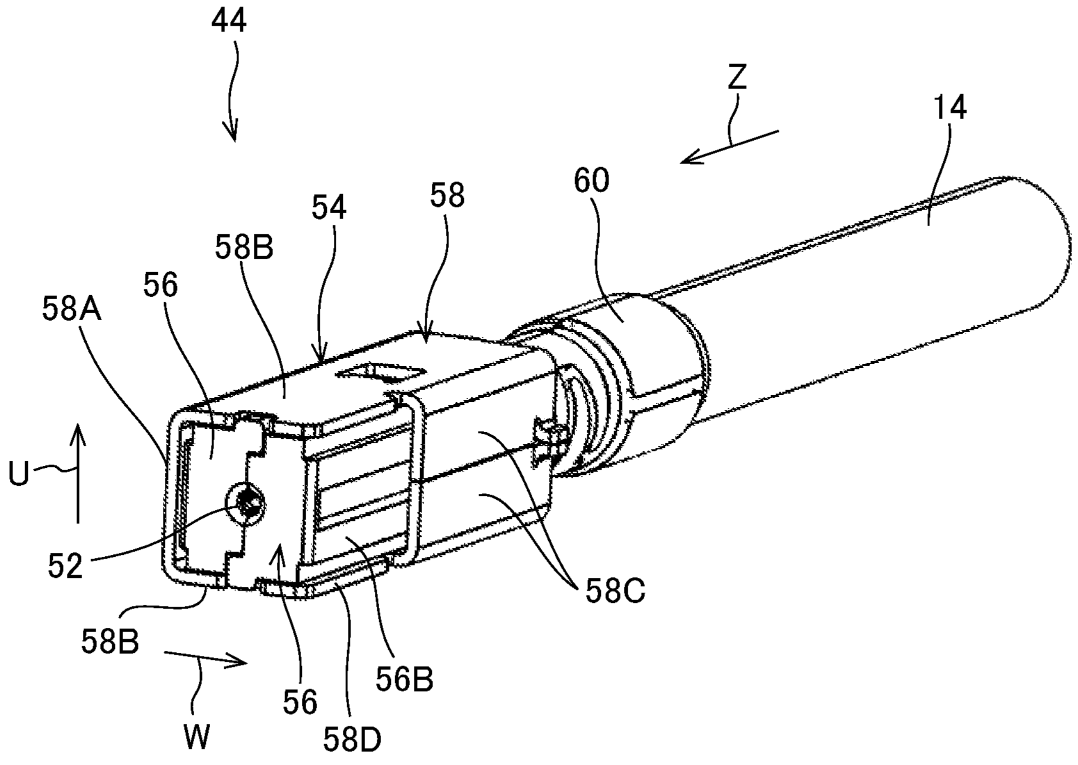
FIG. 16 is a perspective view illustrating a conductor unit.
Figure 17:
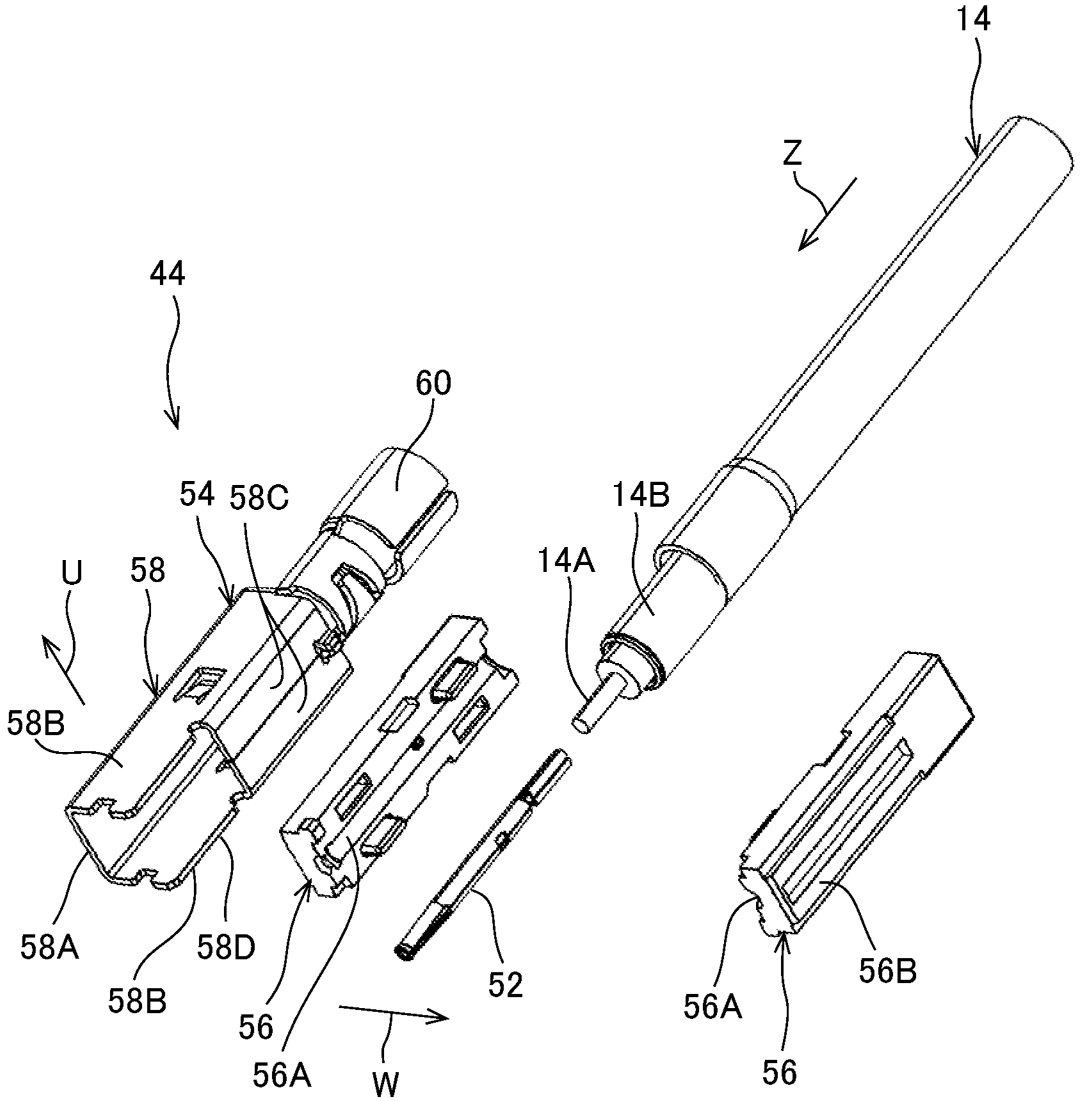
FIG. 17 is an exploded perspective view illustrating an exploded conductor unit.

As illustrated in FIG. 16 and FIG. 17, the conductor unit 44 is configured including the inner conductor 52, an outer conductor 54 covering the inner conductor 52, and a pair of conductor unit-side dielectric bodies 56 serving as a conductor-side dielectric body provided between the inner conductor 52 and the outer conductor 54 to support the inner conductor 52.

As illustrated in FIG. 17, the inner conductors 52 are each formed by, for example, bending a metal sheet into a tube shape. A connection axis direction other side end portion of the inner conductor 52 is fixed to a core strand 14A of the wire 14.

The outer conductor 54 is formed by, for example, fold-bending a metal sheet cutout of a specific shape. The outer conductor 54 includes a conductor-side covering portion 58 and an external conductor fixing portion 60. Note that the external conductor fixing portion 60 is fixed to an external conductor 14B of the wire 14.

The conductor-side covering portion 58 includes a rectangular shaped first conductor plate 58A having a thickness direction in the width direction and extending in the connection axis direction and the up-down direction. The conductor-side covering portion 58 also includes a pair of second conductor plates 58B respectively bending around from the upper end and the lower end of the first conductor plate 58A so as to extend toward the width direction one side. The pair of second conductor plates 58B are formed in rectangular shapes having a thickness direction in the up-down direction and extending in the connection axis direction and the width direction so as to extend parallel to each other. Furthermore, the conductor-side covering portion 58 includes a pair of third conductor plates 58C respectively extending upward and downward from width direction one side ends of the pair of second conductor plates 58B. The pair of third conductor plates 58C are formed in rectangular shapes having a thickness direction in the width direction and extending in the connection axis direction and the up-down direction, and extend parallel to the first conductor plate 58A. Ends of the pair of third conductor plates 58C on the opposite side to the pair of second conductor plates 58B either contact each other or approach close to each other. A tube shaped space is thereby formed between the first conductor plate 58A, the pair of second conductor plates 58B, and the pair of third conductor plates 58C. Most of the inner conductor 52 and the pair of conductor unit-side dielectric bodies 56 are disposed inner this space. In the present exemplary embodiment the pair of third conductor plates 58C is configured so as to extend in a range from a connection axis direction central portion of the pair of second conductor plates 58B across to the connection axis direction other side end thereof. This results in a configuration in which a cutout portion 58D is formed in which part of the conductor-side covering portion 58 is cut out at the connection axis direction one side of the conductor-side covering portion 58.

The pair of conductor unit-side dielectric bodies 56 are each formed in a block shape. A support groove 56A for fitting the inner conductor 52 into is formed at the other conductor unit-side dielectric body 56 side of the one conductor unit-side dielectric body 56, and a support groove 56A for fitting the inner conductor 52 into is formed at the one conductor unit-side dielectric body 56 side of the other conductor unit-side dielectric body 56. As illustrated in FIG. 16 and FIG. 17, the pair of conductor unit-side dielectric bodies 56 fit together in the width direction, with the inner conductor 52 disposed between the pair of conductor unit-side dielectric bodies 56 such that the inner conductor 52 is supported by the pair of conductor unit-side dielectric bodies 56. The pair of conductor unit-side dielectric bodies 56 are disposed inner the conductor-side covering portion 58 of the outer conductor 54. A portion 56B of each of the pair of conductor unit-side dielectric bodies 56 is exposed through the cutout portion 58D in a state in which the pair of conductor unit-side dielectric bodies 56 is disposed inner the conductor-side covering portion 58 of the outer conductor 54.

As illustrated in FIG. 13 to FIG. 15, the wiring connector 16 of the present exemplary embodiment is assembled in the following sequence.

First the plural conductor units 44, 46 are inserted into the respective plural conductor unit housing portions 48A of the conductor unit housing body 48. Then the pull-out preventer member 50 is attached to the conductor unit housing body 48 by anchoring the pair of anchor plates 50C of the pull-out preventer member 50 to the two width direction ends of the conductor unit housing body 48. The wiring connector 16 of the present exemplary embodiment having the plural conductor units 44, 46 arranged in fourteen columns in the width direction and two rows in the up-down direction is assembled through these steps.

Operation and Advantageous Effects of Present Exemplary Embodiment

A description now follows of the operation and advantageous effects of the present exemplary embodiment.

As illustrated in FIG. 1, FIG. 2, and FIG. 13, the board connector 12 and the wiring connector 16 of the present exemplary embodiment are connected together by the connection axis direction side portions of the conductor unit housing body 48 of the wiring connector 16 being inserted into the terminal unit housing 18 of the board connector 12.

The first retainer portion 18F of the terminal unit housing 18 is engaged with the second retainer portion 48B of the conductor unit housing body 48 in the connected state of the board connector 12 and the wiring connector 16. This thereby enables the connected state of the board connector 12 and the wiring connector 16 to be maintained easily. Furthermore, in the present exemplary embodiment a connection retainer member 62 is also engaged with the second retainer portion 48B. Thus release of the engagement between the first retainer portion 18F and the second retainer portion 48B is restricted from occurring by the connection retainer member 62. Note that the connection between the board connector 12 and the wiring connector 16 can be released by removing the connection retainer member 62 from the second retainer portion 48B, and then releasing the engagement of the first retainer portion 18F and the second retainer portion 48B.

When the board connector 12 and the wiring connector 16 are connected together the plural terminal units 20, 22 and the plural conductor units 44, 46 are each respectively connected together at the same time. Thus the configuration of the present exemplary embodiment enables better operability than a configuration in which the plural terminal units 20, 22 and the respective plural conductor units 44, 46 are individually connected to each other. A description follows regarding connection between a single terminal unit 20 and a pair of the conductor units 44.

Figure 18:
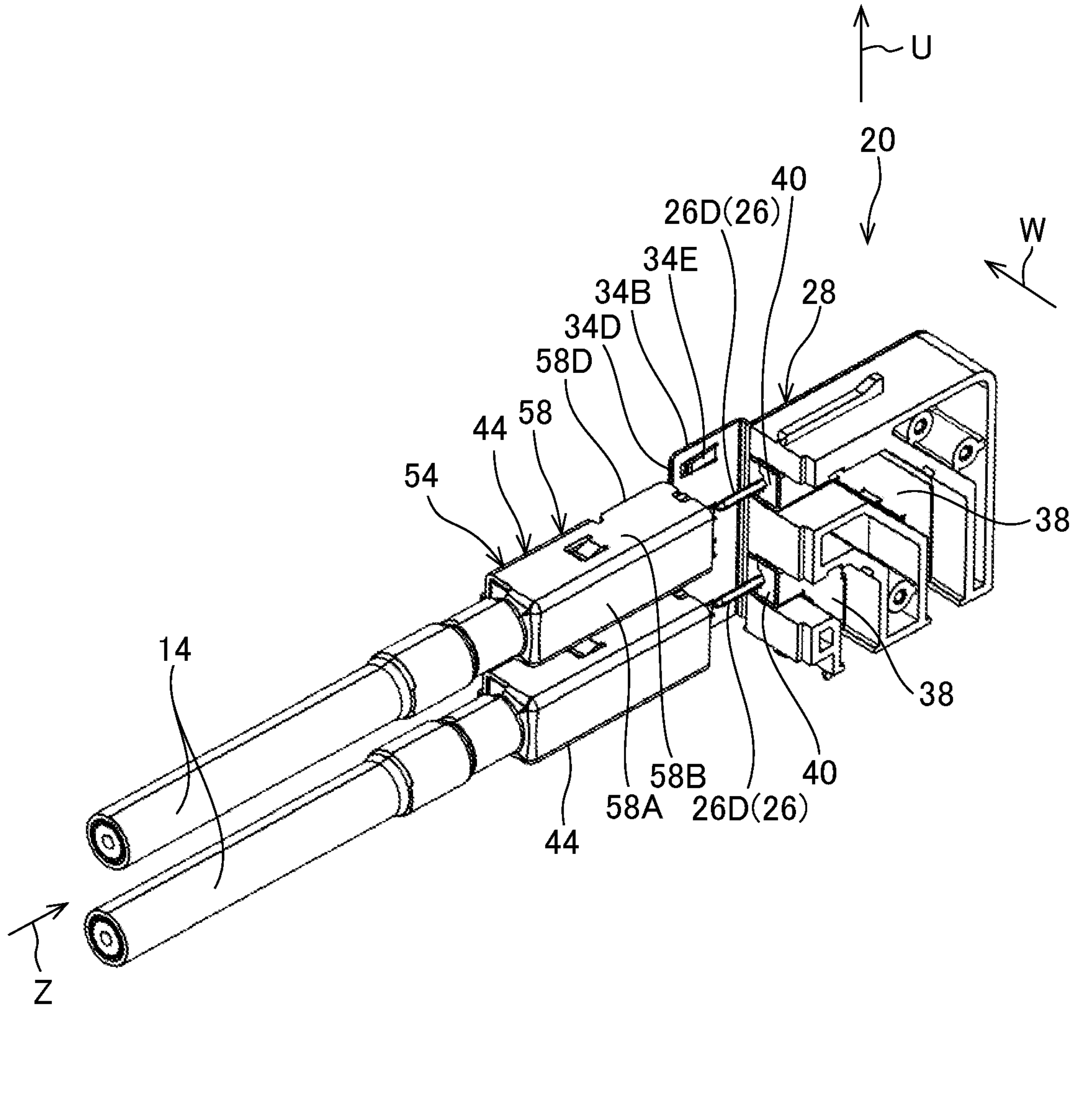
FIG. 18 is a perspective view illustrating conductor units and a terminal unit in a state prior to connection.
Figure 19:
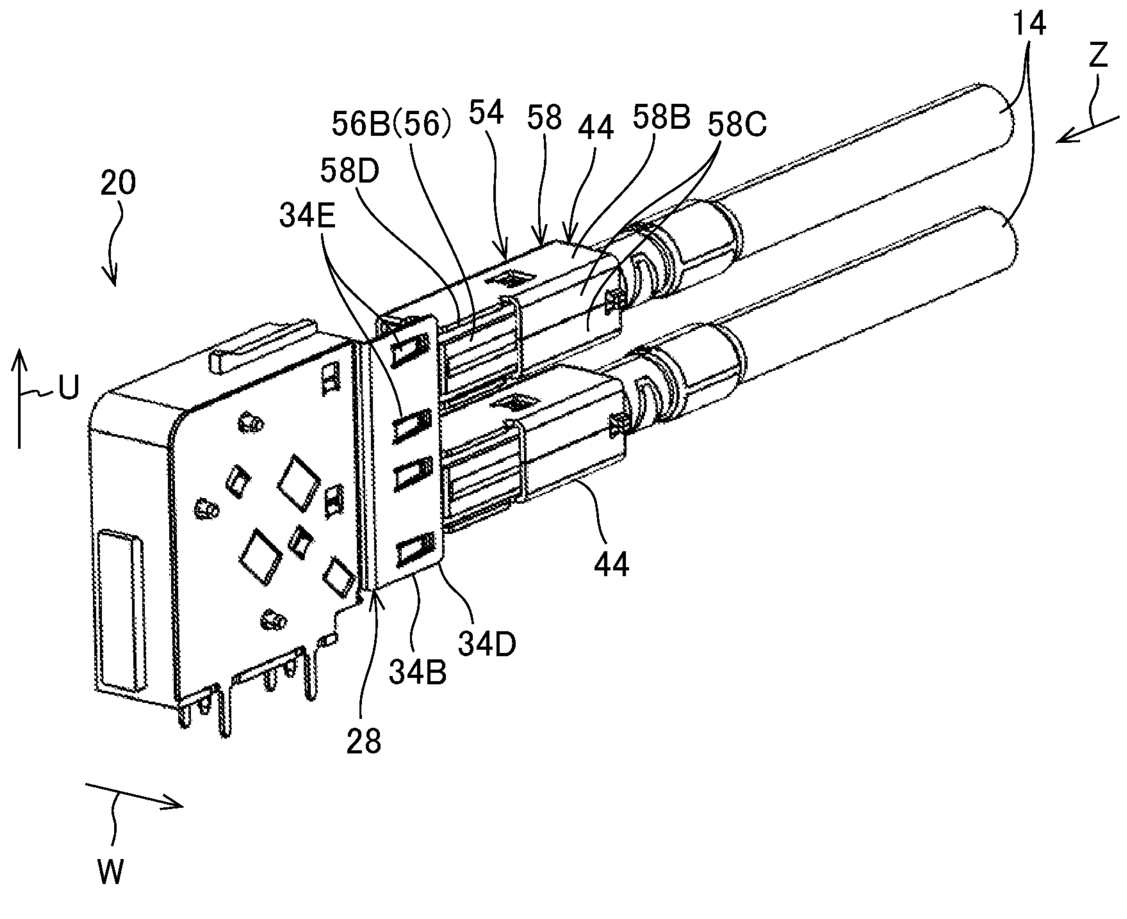
FIG. 19 is a perspective view looking at the conductor units and the terminal unit in a state prior to connection from the opposite side to in FIG. 18.
Figure 20:
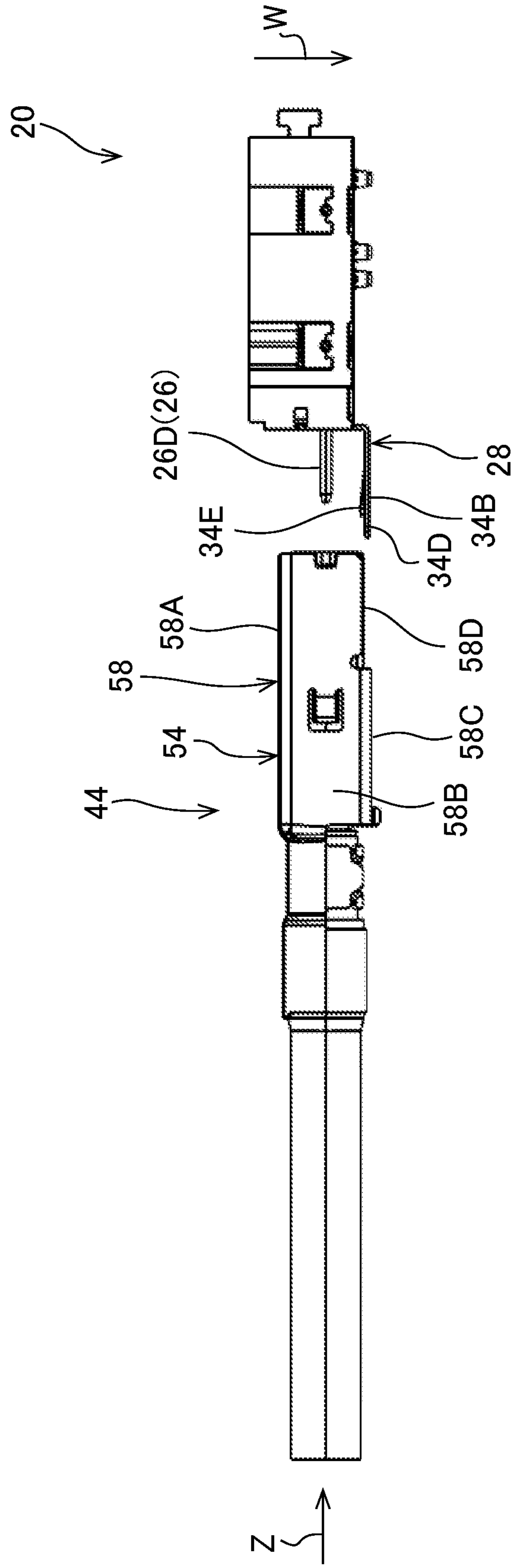
FIG. 20 is a side view illustrating the conductor units and the terminal unit in a state prior to connection.
Figure 21:
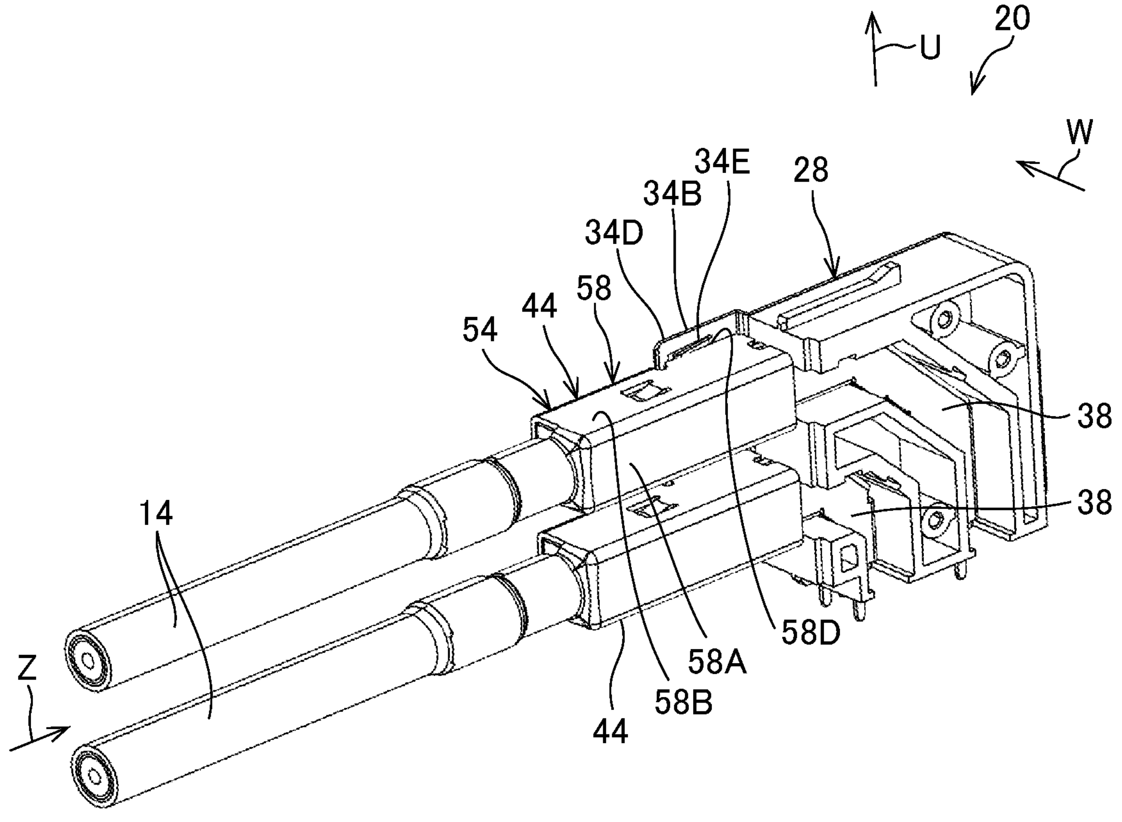
FIG. 21 is a perspective view illustrating conductor units and a terminal unit when connection is complete.
Figure 22:
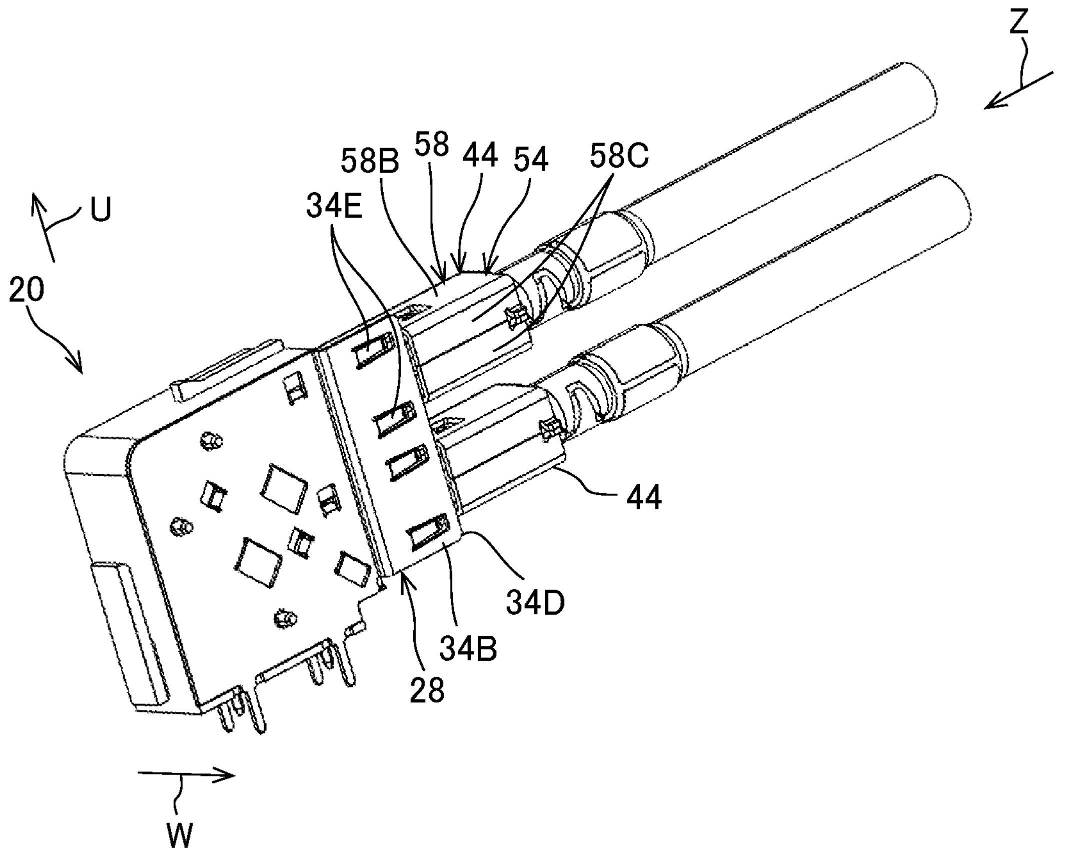
FIG. 22 is a perspective view looking at the conductor units and the terminal unit when connection is complete from the opposite side to in FIG. 21.
Figure 23:
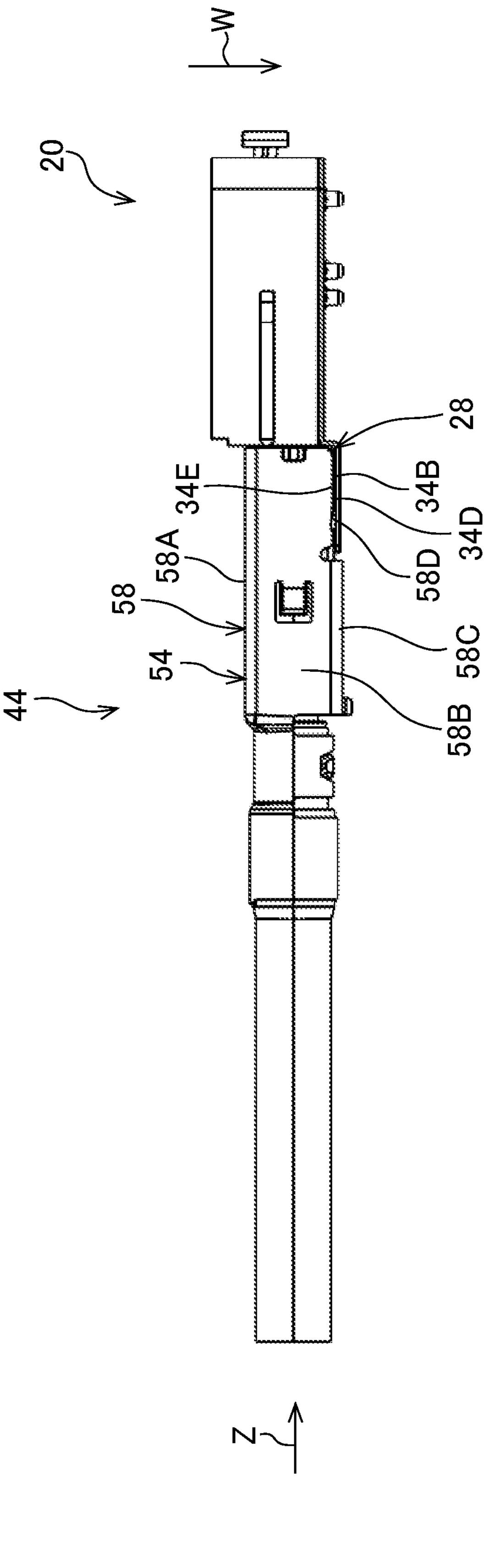
FIG. 23 is a side view illustrating the conductor units and the terminal unit when connection is complete.

FIG. 18 to FIG. 20 illustrate the terminal unit 20 and the pair of conductor units 44 in a state prior to connection. FIG. 21 to FIG. 23 illustrate the terminal unit 20 and the pair of conductor units 44 in a state when connection is complete. As illustrated in these drawings, in the connected state of the terminal unit 20 with the pair of conductor units 44, the connection portion 26D of the one inner terminal 26 of the terminal unit 20 and the inner conductor 52 (see FIG. 16) of the one conductor unit 44 are connected, and also the connection portion 26D of the other inner terminal 26 of the terminal unit 20 and the inner conductor 52 (see FIG. 16) of the other conductor unit 44 are connected.

Moreover, in the connected state of the terminal unit 20 with the pair of conductor units 44, the base plate 34D of the terminal-side extension portion 34B of the outer terminal 28 of the terminal unit 20 is disposed so as to close off the cutout portion 58D of the conductor-side covering portion 58 of the outer conductor 54 of the one conductor unit 44, and to close off the cutout portion 58D of the conductor-side covering portion 58 of the outer conductor 54 of the other conductor unit 44.

Moreover, in the connected state of the terminal unit 20 and the pair of conductor units 44, a pair of the contact portions 34E of the terminal-side extension portion 34B of the outer terminal 28 of the terminal unit 20 make contact with the edges of the cutout portion 58D (the ends of the pair of second conductor plates 58B) of the conductor-side covering portion 58 of the outer conductor 54 of the one conductor unit 44. Furthermore, the other pair of the contact portions 34E of the terminal-side extension portion 34B of the outer terminal 28 of the terminal unit 20 make contact with the edges of the cutout portion 58D (the ends of the pair of second conductor plates 58B) of the conductor-side covering portion 58 of the outer conductor 54 of the other conductor unit 44. The outer terminal 28 of the terminal unit 20 is thereby connected to the outer conductor 54 of the pair of conductor units 44. In the present exemplary embodiment, the contact portions 34E flex away from the edges of the cutout portion 58D when connecting the outer terminal 28 of the terminal unit 20 to the outer conductor 54 of the pair of conductor units 44. The contact portions 34E thereby contact the edges of the cutout portion 58D in a state biased toward the edges of the cutout portion 58D.

The board connector 12 of the present exemplary embodiment includes the plural terminal units 20, 22 each including the inner terminal 26, the outer terminal 28, and the terminal unit-side dielectric body 40. The plural terminal units 20, 22 are arranged in a row in the width direction in a state in which adjacent of the terminal units 20, 22 contact each other. Thus in the configuration of the board connector 12 of the present exemplary embodiment, variation development of the board connector 12 to correspond to variations in the wiring connector 16 is easily enabled by appropriately setting the number of the plural terminal units 20, 22.

Moreover, as illustrated in FIG. 2, FIG. 3, FIG. 8, and FIG. 9, in the board connector 12 of the present exemplary embodiment, the fitting portions 30E of one of the terminal units 20, 22 are fitted into the fitted-to portions 30D of the other terminal unit 20, 22 adjacent to the one terminal unit 20, 22. Relative displacement is thereby limited between the one terminal unit 20, 22 and the other terminal unit 20, 22. As a result positioning can be easily performed of the one terminal unit 20, 22 with respect to the other terminal unit 20, 22 when arranging the plural terminal units 20, 22 in a row in the one direction.

Furthermore, in the board connector 12 of the present exemplary embodiment, the direction in which the fitting portions 30E and the fitted-to portions 30D fit together is a direction intersecting (orthogonal) to the connection axis direction. The fitting portions 30E of the one terminal unit 20, 22 can thereby be suppressed from coming out from the fitted-to portions 30D of the other terminal units 20, 22 when connecting the board connector 12 to the wiring connector 16.

Moreover, as illustrated in FIG. 6 to FIG. 11, in the board connector 12 of the present exemplary embodiment, the outer terminals 28 of the terminal unit 20, 22 are configured by the first terminal forming sheet 34 and the second terminal forming sheets 36. This enables the outer terminals 28 configured with the terminal-side covering portions 38 to be formed cheaply. Furthermore, in the board connector 12 of the present exemplary embodiment, two of the terminal-side covering portions 38 can be formed along a single first terminal forming sheet 34 by combining the single first terminal forming sheet 34 with the two second terminal forming sheets 36.

Furthermore, in the board connector 12 of the present exemplary embodiment, the terminal-side covering portions 38 are each formed by the first main sheet portion 34A, the second main sheet portion 36A, and at least one of the first side sheet portions 34F or the second side sheet portions 36B. This configuration enables the terminal-side covering portions 38 to be formed easily so as to correspond to the inner terminals 26 having a shape fold-bended as in the present exemplary embodiment. Note that this configuration also enables the terminal-side covering portions 38 to be easily formed so as to correspond to inner terminals having a curved shape.

Moreover, as illustrated in FIG. 3, in the board connector 12 of the present exemplary embodiment the plural terminal unit 20, 22 are disposed between the pair of separation restricting portions 18D of the terminal unit housing 18, thereby enabling separation of the plural terminal units 20, 22 in the width direction to be restricted by the pair of separation restricting portions 18D.

Furthermore, in the present exemplary embodiment the coupling member anchor portion 30H of the terminal body 30 of each of the terminal units 20, 22 is anchored in the respective anchor groove 24A of the coupling member 24. This enables the coupled state of the plural terminal units 20, 22 to be maintained easily. In addition thereto, the housing anchor portions 24B of the coupling member 24 are anchored to the anchor grooves 18E formed to the separation restricting portions 18D of the terminal unit housing 18. This enables the plural terminal units 20, 22 and the terminal unit housing 18 to be integrated together firmly.

Moreover, as illustrated in FIG. 13 to FIG. 16, the wiring connector 16 of the present exemplary embodiment includes a conductor unit housing 42 including the plural conductor unit housing portions 48A. Thus the plural conductor units 44, 46 can be supported easily at specific positions on the conductor unit housing 42 by housing each of the plural conductor units 44, 46 in the plural respective conductor unit housing portions 48A.

Furthermore, as illustrated in FIG. 18 to FIG. 23, in a state in which the board connector 12 has been connected to the wiring connector 16 in the present exemplary embodiment, the connection portion 26D of the inner terminal 26 is connected to the inner conductor 52, and also the outer terminal 28 is connected to the outer conductor 54 in a state in which the terminal-side extension portion 34B is disposed so as to close off the cutout portion 58D. Moreover, connection sections between the connection portions 26D of the inner terminals 26 and the inner conductors 52 are covered by the outer conductors 54 and the terminal-side extension portions 34B. In this configuration the connection sections between the connection portions 26D of the inner terminals 26 and the inner conductors 52 are covered, and hence there is no need to arrange the outer conductors 54 and the outer terminals 28 so as to overlap with each other in a direction intersecting with the connection axis direction (a connection axis intersection direction). This enables a more compact configuration of the connector set 10 to be achieved in the connection axis intersection direction.

Moreover, in the present exemplary embodiment the contact portions 34E of the terminal-side extension portion 34B of the outer terminal 28 contact the edges of the cutout portions 58D in a state biased toward the edges of the cutout portions 58D of the outer conductors 54 (the conductor-side covering portions 58). This enables a stable conducting state to be secured between the outer terminals 28 and the outer conductors 54.

Moreover, in the present exemplary embodiment the inner terminals 26 are covered by the terminal-side covering portions 38 of the outer terminals 28, and the inner conductors 52 are also covered by the conductor-side covering portions 58 of the outer conductors 54. This enables good anti-electromagnetic noise performance to be secured. Moreover, in the present exemplary embodiment the terminal unit-side dielectric bodies 40 supporting the inner terminals 26 are provided inner the terminal-side covering portions 38 of the outer terminals 28, and in addition the conductor unit-side dielectric bodies 56 supporting the inner conductors 52 are provided inner the conductor-side covering portions 58 of the outer conductors 54. This configuration enables impedance matching to be achieved easily by adjusting the volumes of the terminal unit-side dielectric bodies 40 and the conductor unit-side dielectric bodies 56.

Although a description has been given above of an exemplary embodiment of the present disclosure, the present disclosure is not limited thereto, and obviously various other modifications may be implemented within a range not departing from the spirit of the present disclosure.

What is claimed is:

1. A connector set comprising:

a plurality of inner terminals including a plurality of connection portions that are connected to corresponding individual inner conductors of a plurality of inner conductors; and an outer terminal including:

a terminal-side covering portion covering the plurality of inner terminals in a state in which the connection portions protrude outward, a terminal-side extension portion extending from the terminal-side covering portion so as to extend alongside the connection portions; and a plurality of terminal-side dielectric bodies provided between the inner terminals and the outer terminal at an inside of the terminal-side covering portion, so as to support the inner terminals, wherein the outer terminal includes a first terminal forming sheet formed from a metal sheet and a plurality of second terminal forming sheets formed from a metal sheet, and the terminal-side covering portion is formed by the first terminal forming sheet and the second terminal forming sheets, wherein a plurality of terminal-side covering portions is-formed between the single first terminal forming sheet and the plurality of second terminal forming sheets so as to respectively cover the plurality of inner terminals, and a plurality of outer conductors each including a conductor-side covering portion covering corresponding individual inner conductors of the plurality of inner conductors and each formed with a cutout portion at an outer peripheral portion on a side to which the corresponding inner terminal connects; and conductor-side dielectric bodies provided between individual ones of the plurality of inner conductors and individual ones of the plurality of outer conductors and at an inside of the conductor-side covering portion, supporting the individual ones of the plurality of inner conductors, and having an outer peripheral portion exposed at the cutout portion of the individual ones of the plurality of outer conductors.

2. The connector set of claim 1, wherein:

the first terminal forming sheet includes a first main sheet portion, and the plurality of second terminal forming sheets include second main sheet portions not touching the first main sheet portion, the first terminal forming sheet includes a first side sheet portion extending from the first main sheet portion toward the second main sheet portions, and the plurality of second terminal forming sheets include second side sheet portions extending from the second main sheet portions toward the first main sheet portion, and the plurality of terminal-side covering portions are formed from the first main sheet portion, the plurality of second main sheet portions, and at least one of the first side sheet portion or the plurality of second side sheet portions.

3. A connector set comprising:

a first connector comprising:

an inner terminal including a connection portion that is connected to an inner conductor; and an outer terminal including:

a terminal-side covering portion covering the inner terminal in a state in which the connection portion protrudes outward, and a terminal-side extension portion extending from the terminal-side covering portion so as to extend alongside the connection portion; and a terminal-side dielectric body provided between the inner terminal and the outer terminal at an inside of the terminal-side covering portion, so as to support the inner terminal; and a second connector comprising:

an inner conductor that connects to an inner terminal;

an outer conductor including a conductor-side covering portion covering the inner conductor and formed with a cutout portion at an outer peripheral portion on a side to which the inner terminal connects; and a conductor-side dielectric body provided between the inner conductor and the outer conductor and at an inside of the conductor-side covering portion, supporting the inner conductor, and having an outer peripheral portion exposed at the cutout portion; wherein:

the connection portion of the inner terminal of the first connector is connected to the inner conductor of the first connector in a state in which the first connector has been connected to the second connector, the outer terminal of the first connector is connected to the outer conductor of the second connector in a state in which the terminal-side extension portion has been disposed so as to close off the cutout portion, and a connection section between the connection portion of the inner terminal of the first connector and the inner conductor of the first connector is covered by the outer conductor of the second connector and the terminal-side extension portion, the terminal-side extension portion includes a base plate disposed along a section of the conductor-side dielectric body exposed at the cutout portion, and a contact portion disposed along an edge of the cutout portion, and the contact portion contacts the edge of the cutout portion in a state biased toward the edge of the cutout portion.

4. A connector set comprising:

a plurality of inner terminals including a plurality of connection portions that are connected to a plurality of inner conductors; and an outer terminal including:

a terminal-side covering portion covering the inner terminals, and a terminal-side extension portion extending alongside the plurality of connection portions; and a terminal-side dielectric body provided between the inner terminals and the outer terminal at an inside of the terminal-side covering portion, so as to support the inner terminals, wherein the outer terminal includes a first terminal forming sheet formed from a metal sheet and a second terminal forming sheet formed from a metal sheet, and the terminal-side covering portion is formed by the first terminal forming sheet and the second terminal forming sheet, wherein the outer terminal includes a single first terminal forming sheet and a plurality of second terminal forming sheets, and a plurality of terminal-side covering portions are each formed between the single first terminal forming sheet and the plurality of second terminal forming sheets so as to respectively cover the plurality of inner terminals, and a plurality of inner conductors that connect to the inner terminals;

a plurality of outer conductors each including a conductor-side covering portion covering corresponding individual inner conductors of the plurality of inner conductors and each formed with a cutout portion at an outer peripheral portion on a side to which the corresponding inner terminal connects; and conductor-side dielectric bodies provided between individual ones of the plurality of inner conductors and individual ones of the plurality of outer conductors and at an inside of the conductor-side covering portion, supporting the individual ones of the plurality of inner conductors, and having an outer peripheral portion exposed at the cutout portion of the individual ones of the plurality of outer conductors.

* * * * *